United States Patent
Brett et al.

(10) Patent No.: US 11,294,536 B2
(45) Date of Patent: Apr. 5, 2022

(54) ACCESSING CONTENT BASED ON SELECTION OF CONTENT IN CONTENT DISPLAY AND DELIVERY SYSTEM

(71) Applicant: PIKSEL, INC., Wilmington, DE (US)

(72) Inventors: Leigh Brett, San Marcos, CA (US);
Kristan Bullett, York (GB); Jose Carvajal, Malaga (ES); Felix Stekolshchik, San Diego, CA (US);
Puneet Johar, York (GB);
Hans-Jurgen Maas, Mainz (DE); Peter Heiland, Dover, MA (US); Ralf Wilhelm Tillmann, Mannheim (DE);
Mark Christie, Doncaster (GB); Philip Shaw, York (GB)

(73) Assignee: Piksel, Inc., Wilmington, DE (US)

( * ) Notice: Subject to any disclaimer, the term of this patent is extended or adjusted under 35 U.S.C. 154(b) by 651 days.

(21) Appl. No.: 15/502,156

(22) PCT Filed: Aug. 5, 2015

(86) PCT No.: PCT/EP2015/068117
§ 371 (c)(1),
(2) Date: Feb. 6, 2017

(87) PCT Pub. No.: WO2016/020463
PCT Pub. Date: Feb. 11, 2016

(65) Prior Publication Data
US 2017/0228114 A1 Aug. 10, 2017

Related U.S. Application Data

(60) Provisional application No. 62/033,520, filed on Aug. 5, 2014.

(51) Int. Cl.
G06F 3/0482 (2013.01)
G06F 16/9535 (2019.01)
H04L 67/75 (2022.01)

(52) U.S. Cl.
CPC ........ *G06F 3/0482* (2013.01); *G06F 16/9535* (2019.01); *H04L 67/36* (2013.01)

(58) Field of Classification Search
CPC .. H04N 21/25; H04N 21/466; H04N 21/4668; H04N 21/4756; H04N 21/4826
See application file for complete search history.

(56) References Cited

U.S. PATENT DOCUMENTS 7,966,632 B1 * 6/2011 Pan ..................... H04N 5/44543
725/45
8,732,737 B1 * 5/2014 Kalmes ............ H04N 21/25883
725/14

(Continued)

OTHER PUBLICATIONS

Otebolaku Abayomo Moradey et al, "Supporting Context-Arare Cloud-Based Media Recommendations for Smartphones", 2014 2nd IEEE International Conference on Mobile Cloud Computing, Services, and Engineering, IEEE, Apr. 8, 2014, XP032605949, DOI: 10.1109/MOBILECLOUD, 2014.26.

(Continued)

*Primary Examiner* — Yassin Alata
(74) *Attorney, Agent, or Firm* — Holzer Patel Drennan

(57) ABSTRACT

There is disclosed a user device including a processor configured to: receive a recommendation message; display a plurality of recommendations based on the recommendation message to a user of the user device, the plurality of recommendations having been generated, in part, on the user context; detect selection of one of the displayed plurality of recommendations; request further recommendations in dependence on the detected selection; receive a further recommendation message responsive to the request; and (Continued)

display a further plurality of recommendations corresponding to the further recommendation message to the user of the user device, the further plurality of recommendations having been generated, in part, on the user context and the detected selection.

19 Claims, 19 Drawing Sheets

(56) References Cited

U.S. PATENT DOCUMENTS

| | | | | |
|---|---|---|---|---|
| 2010/0153292 A1* | 6/2010 | Zheng | ................ | G06Q 30/0282 705/347 |
| 2011/0138064 A1* | 6/2011 | Rieger | ............. | H04N 21/25816 709/228 |
| 2012/0303792 A1* | 11/2012 | Sathish | ............... | G06F 16/9535 709/224 |

OTHER PUBLICATIONS

Zhiwen Yu et al.: "Supporting Context-Aware Media Recommendations for Smart phonese", IEEE Pervasive Computing, vol. 5, No. 3, Jul. 2006, pp. 68-75, XPO55169458, ISSN: 1536-1268, DOI: 10.1109/MPRV.2006.61.

International Search Report and Written Opinion, dated Oct. 23, 2015.

* cited by examiner

| | |
|---|---|
| id | |
| title | |
| description | |
| keywords | |
| twitter_query | |
| locationId | |
| imageUrl | |
| Channel ImageUrl | |
| publishDate | |
| type | |
| url | |

ACCESSING CONTENT BASED ON SELECTION OF CONTENT IN CONTENT DISPLAY AND DELIVERY SYSTEM

CROSS-REFERENCE TO RELATED APPLICATIONS

This application is related to: U.S. Ser. No. 62/033,445 (PWF Ref: 337510USP) filed 5 Aug. 2014; U.S. Ser. No. 62/033,448 (PWF Ref: 337511USP) filed 5 Aug. 2014; U.S. Ser. No. 62/033,471 (PWF Ref: 337512USP) filed 5 Aug. 2014; U.S. Ser. No. 62/033,520 (PWF Ref: 337509USP) filed 5 Aug. 2014; U.S. Ser. No. 62/033,473 (PWF Ref: 337513USP) filed 5 Aug. 2014; U.S. Ser. No. 14/530,435 (PWF Ref: 337510US) filed 31 Oct. 2014; U.S. Ser. No. 62/073,813 (PWF Ref: 338129USP) filed 31 Oct. 2014; and GB Patent Application No. 1419488.0 filed 31 Oct. 2014. The contents of all of these earlier patent applications are incorporated herein by reference.

This application has a claim to priority based on "Navigational Paradigm", U.S. Ser. No. 62/033,520 (PWF Ref: 337509USP) filed 5 Aug. 2014.

BACKGROUND TO THE INVENTION

Field of the Invention

The invention relates to a content delivery system. The invention is particularly concerned with the selection of content displayed on a user device, by accessing a second set of content based on selection of a first set of content, where the first and second sets may be different, in dependence on a context of a user of the user device. The invention is thus concerned with this access being partly based on a context of the user.

Description of the Related Art

In computer devices which exist nowadays, there is a vast array of different kinds of applications which can be selected by a user. These include dynamic media streams such as weather and news updates, social media such as Twitter and Facebook, information such as email and entertainment such as games.

Computer devices are now available in portable form, particularly mobile form and wearable form. For portable devices in particular, the screen resource which is available to display the vast thesaurus of possible applications which a user might want is limited. This either means that a user becomes confused or frustrated, or that the user is in fact not even aware that there may be applications that could be accessed which would be of interest.

Content display and delivery systems exist to provide users of computer devices with information and entertainment. Content comprises a large number of different kinds of presentational materials, including images and text. Content includes dynamic media such as weather and news updates, social media such as Twitter and Facebook, information such as email, and entertainment such as video. It is increasingly problematic for a user to efficiently and successfully navigate their way through this vast proliferation of content to receive and view only that which is relevant to the user. Due to the volume of content, current content display and delivery systems are wasteful of a user's time and network resources, as well as local processing and storage resources.

At present, it is known for a user of a computer device to control their user interface to present to the user tiles, or other selectable components, each allowing a particular application (known as an app) to be selected. A user can organise these tiles or selection components in a manner that the user sees fit, and each time the device is turned on the layout the user has chosen will be presented to the user. These layouts can be user configurable depending, for example, on the level of interest that a user has in particular applications. It is also known that it is possible to alter the size of the tiles or selection components so that a user can have larger tiles for applications that the user uses more often or finds more interesting.

Also known are recommendation engines which aim to provide users with content that they will find interesting. This measure of relevance depends of course on the individual user; what one user finds interesting may not be attractive at all to another.

Such a system for recommending content is able to estimate how interesting an item of content is to a user by using a number of techniques. These might include looking at how a user has responded to other content in the past; fitting users into groups characterised by shared interests or other properties and using this to infer interest in particular items (i.e. inferring a microscopic trend from a macroscopic one); looking at what friends are watching and so on.

As well as providing a user with a content recommendation, known recommendation systems may provide an activity recommendation.

These concepts are clearly understood within the realm of recommendation systems for content display and delivery systems.

It is an aim of the present invention to provide an improved content display and delivery system in which an improvement is provided to the recommendations given to a user.

SUMMARY OF THE INVENTION

In accordance with the invention, an improved content display and delivery system is provided by displaying a first content, and displaying a second content responsive to selection of that first content.

The present invention thus enables content to be accessed through content. Specifically a first content may be used to access a second content. The second content is preferably, but not essentially, of a different type to the first content. The recommendation engine performs a further recommendation based on a selection from a first recommendation.

The recommendation of content is nested.

The second content may be shown on a different device than the first, e.g. on a television rather than a phone, even if selection was made on the phone.

There is provided a user device including a processor configured to: receive a recommendation message; display a plurality of recommendations based on the recommendation message to a user of the user device, the plurality of recommendations having been generated, in part, on the user context; detect selection of one of the displayed plurality of recommendations; request further recommendations in dependence on the detected selection; receive a further recommendation message responsive to the request; and display a further plurality of recommendations corresponding to the further recommendation message to the user of the user device, the further plurality of recommendations having been generated, in part, on the user context and the detected selection.

Any subsequent recommendations based on a selection may be based, at least in part, on the user context and all previous selections and their associated recommendations.

The processor may be configured to include an identification of the type of the user device in each request for recommendations, wherein the recommendations message is generated, in part, in dependence on the type of the computer device.

The processor may be configured to transmit an initial recommendations request message, the recommendation message being received responsive to the initial recommendations request message.

The processor may be configured to include an identification of the type of the user device in initial recommendations request message, wherein the initial recommendations message is generated, in part, in dependence on the type of the computer device.

The recommendation messages may include identifiers corresponding to each recommendation of the respective set.

The further plurality of recommendations may include at least two recommendations of a different type to the plurality of recommendations.

The processor may be configured to display a static image responsive to the first recommendation message.

The processor may be configured to display a moving image responsive to the second recommendation message.

The selection may be by user input.

There is also provided a recommendation server including a processor configured to: generate a first set of recommendations for a user in dependence on the user context; transmit a first recommendation message based on the first set of recommendations; receive a recommendation request including an identification of a selection of one of the first set of recommendations; generate a second set of recommendations based on the identified one of the first set of recommendations and the user context; and transmit a second recommendation message based on the second set of recommendations.

The processor may be further configured to receive a further recommendation request including an identification of a selection of one of the recommendations; and generate a subsequent set of recommendations based on the selected recommendation and the user context; and transmit a further recommendation message based on the further recommendations.

The recommendations server may further comprise generating the recommendation messages for transmission to a user terminal of a user.

The recommendations server may further include an interface for receiving a context for the user from a context engine.

In a first context, the further recommendation may be a long form version of a displayed short form video asset.

In a second context, the further recommendation may be a static article, e.g. news.

The processor may be adapted to transmit the recommendation message to a first user terminal associated with the user, and to transmit the further recommendation message to a second user device associated with the user.

There is also provided a method comprising the steps of: receiving a recommendation message; displaying a plurality of recommendations based on the recommendation message to a user of the user device, the plurality of recommendations having been generated, in part, on the user context; detecting selection of one of the displayed plurality of recommendations; requesting further recommendations in dependence on the detected selection; receiving a further recommendation message responsive to the request; and displaying a further plurality of recommendations corresponding to the further recommendation message to the user of the user device, the further plurality of recommendations having been generated, in part, on the user context and the detected selection.

Any subsequent recommendations may be based on a selection are based, at least in part, on the user context and all previous selections and their associated recommendations.

The method may further comprise including an identification of the type of the user device in each request for recommendations, wherein the recommendations message is generated, in part, in dependence on the type of the computer device.

The method may further comprise transmitting an initial recommendations request message, the recommendation message being received responsive to the initial recommendations request message.

The method may further comprise including an identification of the type of the user device in initial recommendations request message, wherein the initial recommendations message is generated, in part, in dependence on the type of the computer device.

The recommendation messages may include identifiers corresponding to each recommendation of the respective set.

The further plurality of recommendations may include at least two recommendations of a different type to the plurality of recommendations.

The processor may be configured to display a static image responsive to the first recommendation message.

The processor may be configured to display a moving image responsive to the second recommendation message.

The selection may be by user input.

There is also provided a method comprising: generating a first set of recommendations for a user in dependence on the user context; transmitting a first recommendation message based on the first set of recommendations; receiving a recommendation request including an identification of a selection of one of the first set of recommendations; generating a second set of recommendations based on the identified one of the first set of recommendations and the user context; and transmitting a second recommendation message based on the second set of recommendations.

The method may further comprise receiving a further recommendation request including an identification of a selection of one of the recommendations; and generate a subsequent set of recommendations based on the selected recommendation and the user context; and transmit a further recommendation message based on the further recommendations.

The method may further comprise generating the recommendation messages for transmission to a user terminal of a user.

The method may further comprise receiving a context for the user from a context engine.

In a first context, the further recommendation may be a long form version of a displayed short form video asset. In a second context, the further recommendation may be a static article, e.g. news.

The method may further comprise transmitting the recommendation message to a first user terminal associated with the user, and to transmit the further recommendation message to a second user device associated with the user.

An example provides a content delivery system comprising: a control server configured to receive a request for content from a user device which is one of a number of device types and to select a set of content items responsive to the request, a user device coupled to the control server over a communication network and a screen configured to display each content item in the set in a respective display zone; wherein each content item displays an image on the screen, the user device having a processor responsive to user selection of one of the images to transmit to the control server a request for further content, said further content dependent on the content of the selected image.

The invention also contemplates separable components of the content delivery system as independent inventions, and computer program products for implementing the methods and processes described herein.

BRIEF DESCRIPTION OF THE FIGURES

For a better understanding of the present invention and to show how the same may be carried into effect, reference will now be made, by way of example only, to the accompanying drawings, in which:

FIGS. 11 to 31 show screen shots of different use cases.

DESCRIPTION OF THE PREFERRED EMBODIMENTS

Figure 1:
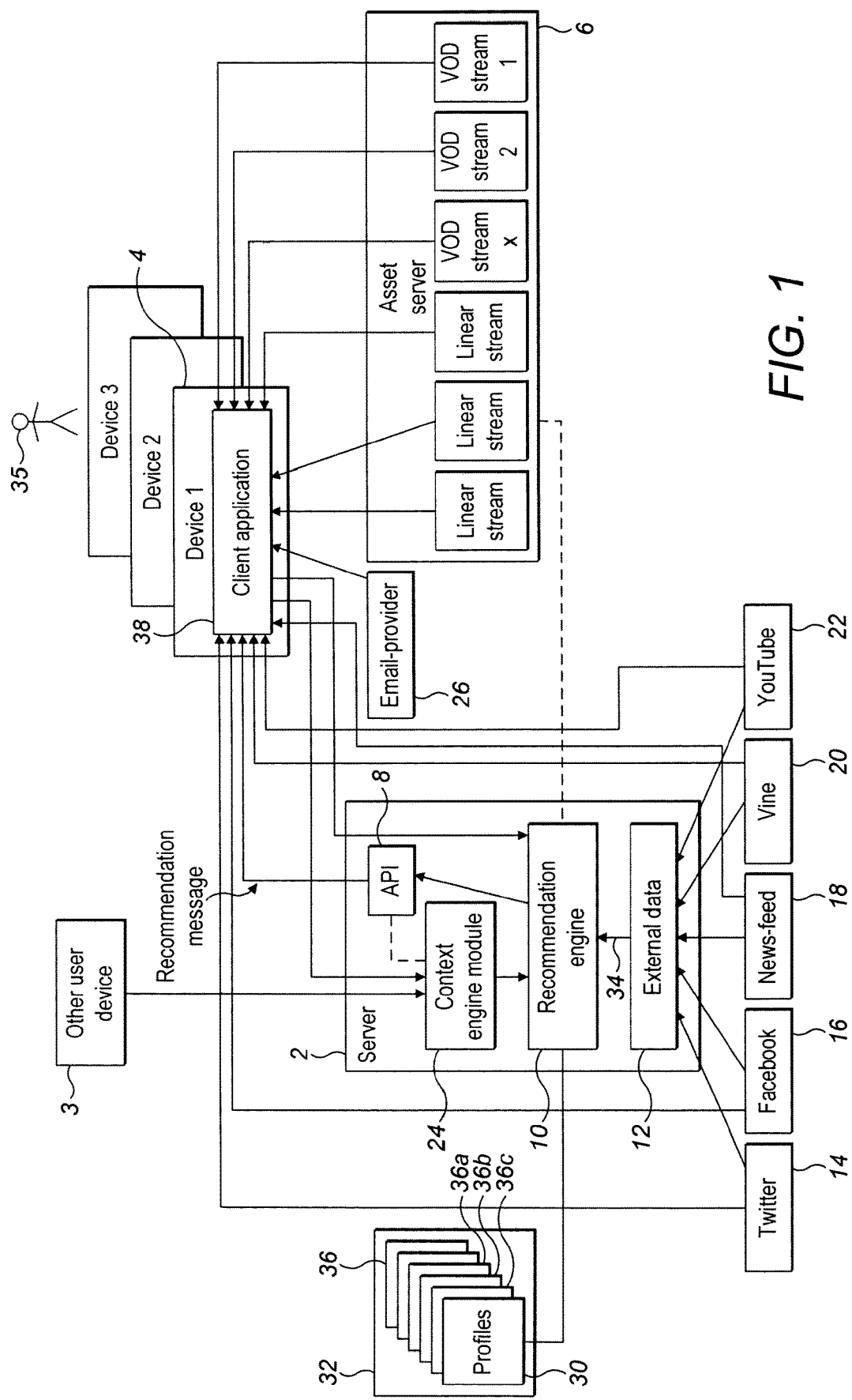
FIG. 1 is a schematic diagram of an exemplary overall architecture of a content delivery system.

The invention is described by way of reference to examples and embodiments. The invention is not limited to the details of any specific example or embodiment, and features of different examples and embodiments may be combined.
General FIG. 1 is a schematic architecture of a high level design of an exemplary content delivery system. A control server 2, being a content delivery server, is connected to a user terminal 4 of a user 35 by any suitable communication network, whether wired or wireless. The network is not shown in FIG. 1 for reasons of clarity. The user terminal 4 is also in communication with an asset server 6 via a same or different network.

The asset server 6 supplies video assets which can be linear stream assets or VOD assets. The user terminal 4 requests assets from the asset server 6 based on information which it receives from the content delivery server 2. Although a single asset server 6 is illustrated and described, a plurality of asset servers may be provided.

The content delivery server 2 comprises: an application program interface (API) 8, for example a REST API; a recommendation engine module 10; a data aggregator module 12; and a context engine module 24. The recommendation engine module 10, data aggregator module 12 and context engine module 24 are all implemented by a suitably programmed processor or processors (not shown).

The data aggregator module 12 connects to a number of content sources to the content delivery server 2, again by any suitable communication network. In this example, these sources comprise a Twitter feed 14, a Facebook feed 16, a news-feed 18, a Vine feed 20 and a YouTube feed 22. These are exemplary only and it will readily be appreciated that other content sources may be appropriate.

The content delivery server 2 has access to user profiles 30, either in a local memory (not shown) or in a storage facility 32 accessible to the content delivery server 2.

The data aggregator module 12 receives information from the multiple sources 14, 16, 18, 20, 22 and monitors their content so as to be able to supply content based information 34 to the recommendation engine module 10.

In one mode, or context setting (described later), the recommendation engine module 10 operates based on the content-based information supplied by the data aggregator module 12 to recommend video assets which can be accessed by the user terminal at the asset server 6. Thus the recommendation engine module 10 has information about all assets available in the asset server 6, and operates to recommend assets to the user 35 (via the user device 4) based on the content-based information 34 it receives from the data aggregator module 12.

In another mode, or context setting, the recommendation engine module 10 operates based on user profile or behaviour history, without referencing the content from the multiple content sources. This will become evident in the context of the use cases to be described.

The mode of operation depends on how the user interacts with the recommendation engine.

The user terminal 4 is labelled "Device 1". A user 35 may own multiple devices, which are indicated in FIG. 1 by the labelling Device 2, Device 3. Each of these devices is a user terminal. For example, a user 35 might own a tablet, a smartphone, a laptop and a TV set. The user may be using one or more devices at any particular time. In one particular use case mentioned later the user may, for example, be using a smartphone (Device 1) and a TV set (Device 2), with the smartphone acting as a companion to the TV set. In any event, all the devices are capable of communicating with the content delivery server 2 when they are active and logged on by the user 35.

Also shown in FIG. 1 is other user device 3. This represents a user device associated with a different user. In practice there may be a plurality of additional users, and each additional user may be associated with one or more user devices. Each user device may provide an input to the context engine of the context server 2. The context for any given user is thus generated based, at least in part, on inputs receive from other user devices than the specific user device 4.

In FIG. 1, connections are shown between the user terminal 4 and the content delivery server 2. In particular, the user terminal 4 feeds data back to the context engine module 24 and the recommendation engine module 10. In addition, the devices can communicate with the asset server 6 to obtain assets from the asset server 6.

In some of the examples described herein, the system is capable of delivering context recommendations based on the type of device that a user is currently logged in to.

The user 35 has a profile 36 in the user profile 30. In this user profile are stored preferences and other information about the user 35 to allow recommendations to be made based on information personal to that user. In the present system, the user can set up individual sub-profiles, 36a, 36b, 36c, etc. which allow the user to have different preferences in different situations that the user may find themself in. This means that recommendations based on the user sub-profiles could vary even for the same user when that user is in different settings.

It will readily be appreciated that a single user is being discussed, but in practice the content delivery system operates with a large number of different users, where all users have profiles and sub-profiles set up for them respectively. Only a single profile and its sub-profiles is shown in FIG. 1 for the sake of convenience.

In addition to providing recommendations based on device type, the system may provide recommendations based on context. Context may be determined based on context data such as location, time and available time as will become evident from the examples discussed later. As noted above, the context data used for determine a context for a user may be provided by a plurality of user devices, including user devices associated with other users.

The multiple content sources 14 to 22 are also accessible to the user terminal 4 itself as denoted by the various arrows. The purpose of these connections is to allow the user terminal 4 to access content from the multiple sources 14 to 22 when invited to do so on the instructions received from the content delivery server 2. Thus, these sources operate in two ways. Firstly, they provide content to the data aggregator module 12 for driving the recommendation engine module 10, and secondly they provide content items for display to a user at the user terminal, when they are recommended to the user terminal and when the user selects one or more of them to consume.

The context engine module 24 influences the recommendation engine module 24 so that the recommendations are based on the context of a user. The context of a user is perceived here to govern the behaviour of a user and therefore to affect their likely preferences for engaging with content. The likely context based preferences for a user can be determined by monitoring historical behaviour of a user, or can default to certain conditions based on information about the user, for example, in the user profile. A user can set or override context parameters associated with the context engine module 24 should they wish to do so. The context engine module 24 may also influence the recommendation engine to define the number and type of assets to be recommended to a user, based on context.

The user device 4 executes a client application 38 which cooperates with the context engine module 24 of the content delivery server 2 to deliver context based recommendations.

Also shown in FIG. 1 is an email provider 26, connected to the user terminal 4.

Figure 2:
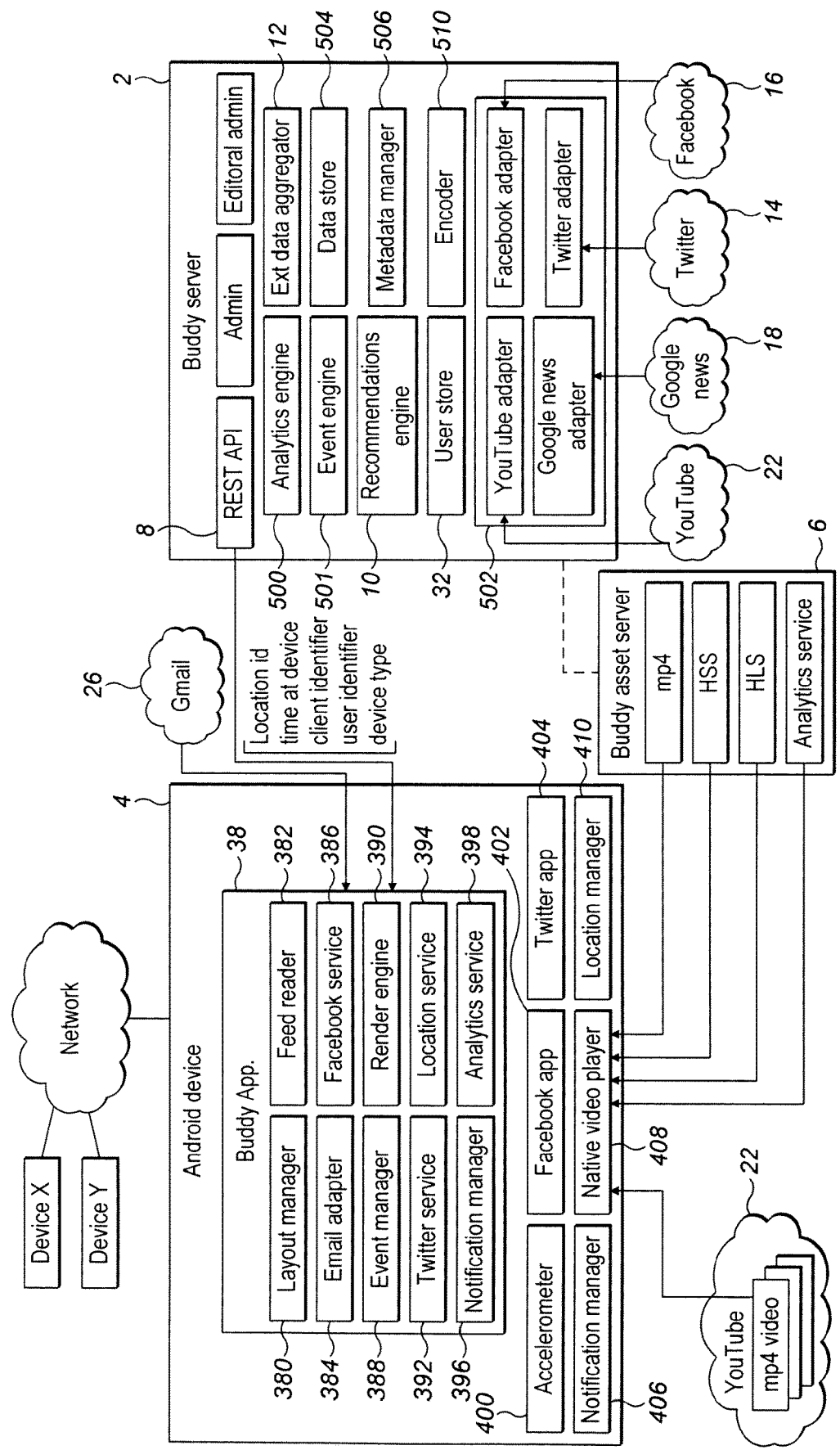
FIG. 2 is an expanded schematic diagram of the architecture.

FIG. 2 is a schematic block diagram of another embodiment of the architecture of a system. The architecture shares elements with FIG. 1, and these are denoted by common reference numerals and includes the client device 4 and the content delivery server 2. In addition, FIG. 2 shows the following components.

At the client device 4, the software components within the client application 38 are shown as follows:
  Layout manager module 380
  Feed reader module 382
  Email adaptor module 384
  Facebook service module 386
  Event manager module 388
  Render engine module 390
  Twitter service module 392
  Location service module 394
  Notification service module 396
  Analytics service module 398

The client device 4 also includes an accelerometer 400 and has the following software components installed:
  Facebook app module 402
  Twitter app module 404
  Notification manager module 406
  Native video player module 408
  Location manager module 410

A buddy asset server provides the asset server 6, and as shown in FIG. 2 includes an mp4 module, a HSS module, a HLS module, and an analytics service module. An mp4 video module in network 22 provides YouTube content to the native video player 408. The native video player 408 of the user device 4 receives an input from each of the modules of the buddy asset server 6.

In addition to the data aggregator module 12, the content delivery server 2 includes a stream adaptor component 502. The stream adaptor component 502 includes a YouTube adapter, a Facebook adapter, a Google News adapter and a Twitter adapter. Each of these adapters is connected to respectively receive metadata which describes content: YouTube content 22, Google news content 18, Twitter content 14, and Facebook content 16. Although not shown in FIG. 2, the output of these adapters is fed to the data aggregator module 12. In addition, the content delivery server 2 comprises an analytics engine 500, event engine module 501, data store module 504, metadata manager module 506 and encoder module 510.

The recommendations engine 10 is also shown in the content delivery server 2 of FIG. 1. The user store 32 is shown in FIG. 2 as part of the content delivery server 2.

The API 8 of the content delivery server 2 is also shown in FIG. 2, as is an administration module and an editorial administration module.

The stream adaptor component 502 operates according to the common adaptor principle. Data from a wide range of disparate sources is used by the content delivery system. In order to deal with this variety of sources, the interfaces which are presented are generalised so that the system need only be aware of one type of interface. This interface contains a superset of possible data structure options to accommodate each type of data likely to be communicated over it. When a new data source is added to the content delivery system, gaining access to this data is then a matter of creating a wrapper around the data source to conform it to this common interface. Once in the content delivery server, data received from such a source can be weighted, analysed, recommended, rejected, prioritised, etc. using the same functions and processes as every other piece of data.

Also shown in FIG. 2 is a network to which client device is connected, and with other devices (Device X, Device Y) connected to the network.

A Gmail module 26 is the exemplary email provider (26 of FIG. 1), connected to the client application 38.

The exemplary content delivery system of FIG. 2 is capable of compiling video snippets based on various contexts which are derived from parameters including: location, time (possibly short-form in the day and long-form in the evening), device (flat screen TV, laptop, mobile device), and available time (that is, the time available to a user to engage with particular content). The terms short-form and long-form define different types of assets—other types of content include news articles, linear news, social content. As mentioned above, different types of assets can be stored in the asset server 6, or available from the multiple sources 14 to 22. In addition, other assets can be available from different sources (not shown), for example, static news articles.

A content item is a piece of content. The term "asset" is used herein to denote video assets and also other types of content items without limitation.

Thus, the content, type and number of the recommended assets may vary with context.

Figure 3:
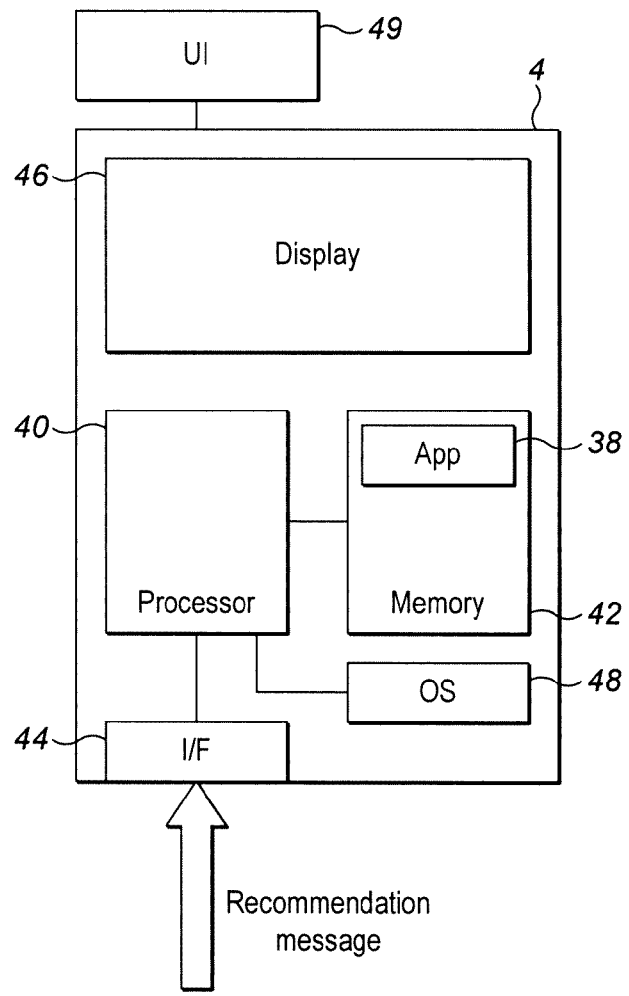
FIG. 3 is a schematic block diagram of a user device.

FIG. 3 is a schematic block diagram of an exemplary user terminal 4. The user terminal 4 comprises a processor 40 and a memory 42. The client application 38 is stored in the memory 42 and is executed by the processor 40. The user terminal 4 also has an interface 44 and a display 46. The display is controlled by the processor 40. As will be evident from the following, instructions received from a content delivery server 2 in a recommendation message at the interface 44 are used by the processor 40 to control the display 46. Although one processor is shown, it will be evident that the display could in fact be controlled by a dedicated graphics card or dedicated driver responsive to the instructions received from the content delivery server 2. The user terminal 4 has its own operating system 48. When delivering content of different types to a display 46 of a known computer device, such as a smartphone or tablet, it is the operating system which is generally responsible for aggregating different types of content and driving the display to display those different types of content. In the described exemplary system however it is the application 38 which is executed by the processor 40 and which is responsive to instructions in the recommendation message from the content delivery server which controls the display and allows the display to show a range of content choices and, upon user selection/engagement, retrieve and display or otherwise act on different types of assets and actions. Thus, the recommendations can be delivered to different kinds of devices running different kinds of operating systems (for example, android, IOS, etc.). Thus, a similar experience can be delivered to users even if they are using different device types.

Moreover, preferably it is the content delivery server 2 itself which manages the layout of the display for a particular device and the content recommendations for a particular user, so that the particular OS which is being executed by the device to support the basic operations of the device does not affect the content delivery system. Moreover, the content delivery server can deliver a recommendation message to any user terminal executing a consumer application 38 regardless of its operating system. Different user devices may run different consumer applications, but with the different consumer applications adapted to different types of user device. Thus there are provided different applications for different user devices (or terminals) which allow similar functionality to be run, with a similar look and feel and a similar user experience. This allows an "eco system" to be developed wherein an operator of the content delivery server 2 can manage recommendations to best fit the users that it is used to engaging with, to make maximum use of the knowledge of those users, their behaviours and profiles, etc. For example, an owner of the content delivery server 2 can determine which content sources (14-22) are available and add their own specific content sources if they wish. This allows them to "shape" content delivered to a user.

A user may add his own source of content, subject to permission from the service provider.

It can be noted that FIGS. 1 and 2 show a source of an activity in the form of an email service accessible to the user device 4. In FIG. 1 this is an email service 26. In FIG. 2 this is Gmail 26.

Figure 4:
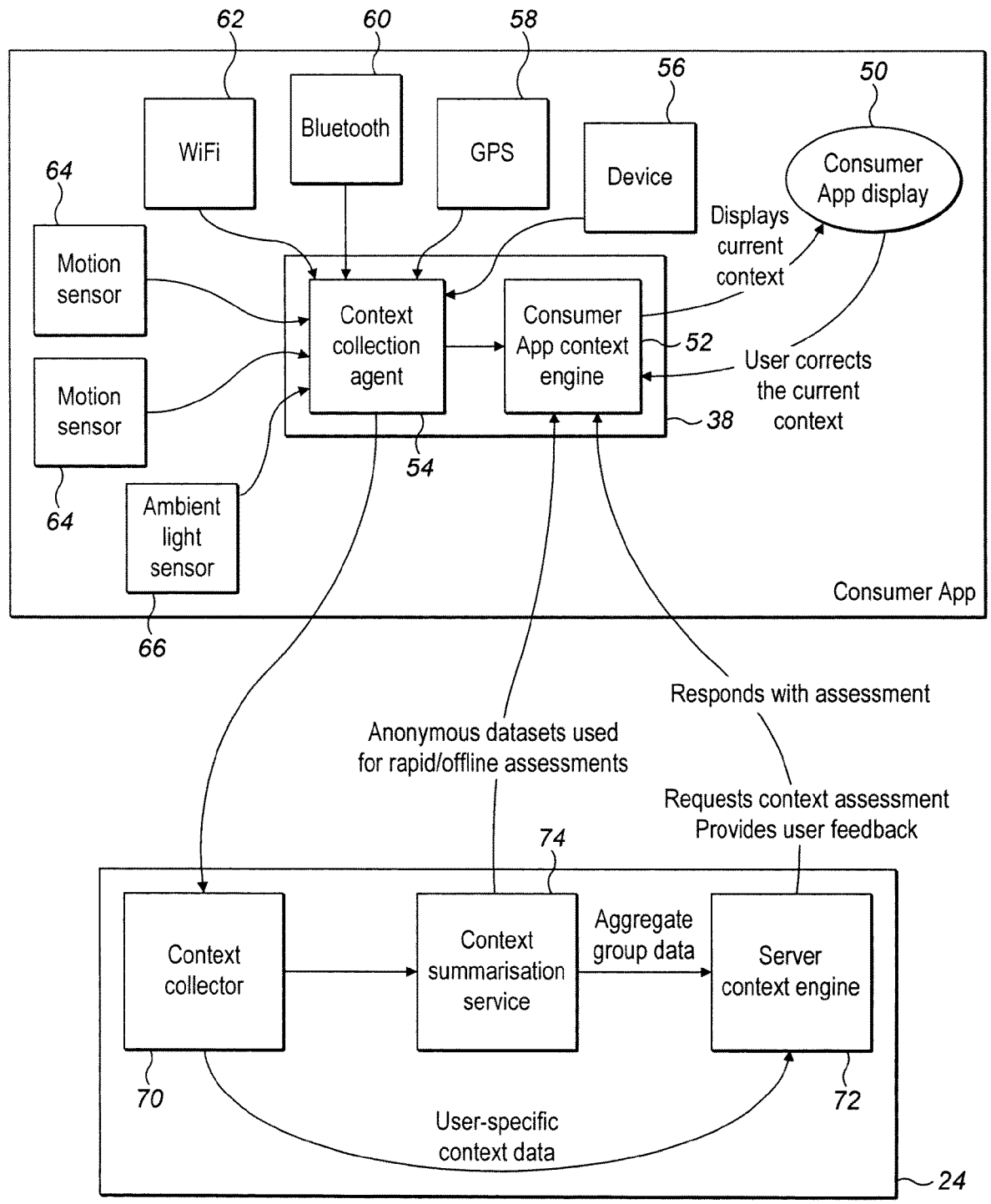
FIG. 4 is a schematic diagram illustrating a context engine at a server side and a client side.

Reference will now be made to FIG. 4 to describe an example of how the context engine module works.

There are two parts in the example of FIG. 4: a client side part installed on the user device 4, with an application 38; and a server side part embodied in the context engine module 24 of the content delivery server 2.

A context engine system (CES), which may include both parts, is designed to provide a list of contexts within which it believes a given user exists at any particular moment.

Because the CES cannot know for sure what context a user is in, it provides its assessment as a list of probabilities. Any context assessed with a sufficiently high probability is considered to be 'active' for that user. Users can be in more than one context at once: for example, they could be at home and with family; at work but about to go on vacation; at a bar with work colleagues, etc.

A user may always have visibility of the contexts the CES thinks they are in, and the context is shown by the oval context display component 50 which shows context to a user on the display 46. This presentation also gives the user the option to correct their context. For example, if the CES had thought the user was at home enjoying some leisure time, but actually they are working from home; or they are on a business trip rather than a holiday. A user can engage with the display through a user interface (UI) touch screen, mouse, etc. to adapt their context.

The CES preferably includes context engine logic 52, 54 present within the application 38 on the user device 4, as well as the context engine module 24 of the server 2, so that the application on the device 4 is able to determine context even if there is limited access to the Internet. The whole idea of the ecosystem context is to make the application valuable to users. One way of achieving this is to reduce its bandwidth footprint when on holiday and using expensive cellular data.

The application 38 on the user device 4 includes a context collection agent 54 and a consumer application context engine 52.

The context collection agent 54 is a software service that resides within the consumer application 38, on the device 4, which collects information and intelligence from the sensors available to it. Some example sensors are shown including device sensor 56, location (GPS) 58, Bluetooth 80, Wi-Fi 62, motion sensors 64, and ambient light sensor 66. The context collection agent 54 receives raw data from these various sensors available to it.

The context collection agent 54 does not simply record the raw data arising from these sensors, but may also perform some basic calculations from it.

The device sensor 56 provides local information about the device, e.g. the device type and its current time zone. For example, it tracks changes in time zone for the device and records this change as a significant event.

A summary of rates of change of motion are provided by the motion sensors 64, to determine whether it is believed the user is walking or being conveyed in some way.

Changes in WiFi network name, the security settings of a network, the rate of movement amongst local Bluetooth devices, are all metrics to be tracked beyond the raw data that any of these sensors provide.

The context collection agent 54 collects this raw context data and sends it to the server side context collector 70 whenever a network connection exists to do so. It also makes this information available directly to the local consumer application context engine 52.

The context collector 70 acts as a data collection endpoint for all users' context information. Thus the context collector 70 collects and stores the context data from multiple context collection agents 54 of multiple user devices.

The context collector 70 is used by the server side server context engine 72, where more detailed context assessments are performed, as well as by a context summarisation service 74 at the server side.

The context summarisation services 74 takes all the data collected about all users and summarises it into recognisable groups and patterns. The content delivery server 2 is connected to multiple devices, and receives context data from the multiple devices.

Anonymised patterns, in this way, can be used by the server context engine 72 to decide if a particular user's context information is a better match for one behaviour or another when calculating its probability list for them.

Different users commute at different times, for example. The context summarisation service 74 will look at motion, GPS, pedometer and time of day information and summarised patterns for distinct groups of users. This information is used by the server context engine 72 to fine tune its assessments.

Similarly, appropriate summary data sets will occasionally be provided to the consumer application 38 so that it can use them to make rapid context assessments if it finds itself bandwidth constrained. Appropriate summary data sets are those which the content delivery server 2 believes best match a user's typical behaviour which the consumer application context engine 52 can use to make a best effort assessment while it waits for a better assessment from the server.

The server context engine 72 is a more functional version of the consumer application context engine 52. It is able to perform more detailed analysis of a user's context data inputs before making a determination of what it believes are the most probable contexts within which the user finds themselves. It has full access to anonymous data sets from the context summarisation service 74 with which it can compare its assessments for a given user and adjust according to expected behaviours.

The consumer application context engine 52 is a pared down version of this, capable of operating on a handheld device or set top box (STB). It uses information provided directly by the context collection agent 54 to make assessments of what it thinks the user is doing. It balances this with information it may or may not receive from its content delivery server 2 based counterpart 72, and the summary data from the context summarisation service 74.

The context display component 50 makes the current context assessments visible to the user so that they can see what has been determined and so that they can provide their feedback on this.

Feedback provided in this way is used to inform the context engines of both the consumer application 38 and the content delivery server 2 to allow them to adjust future assessments.

Figure 5:
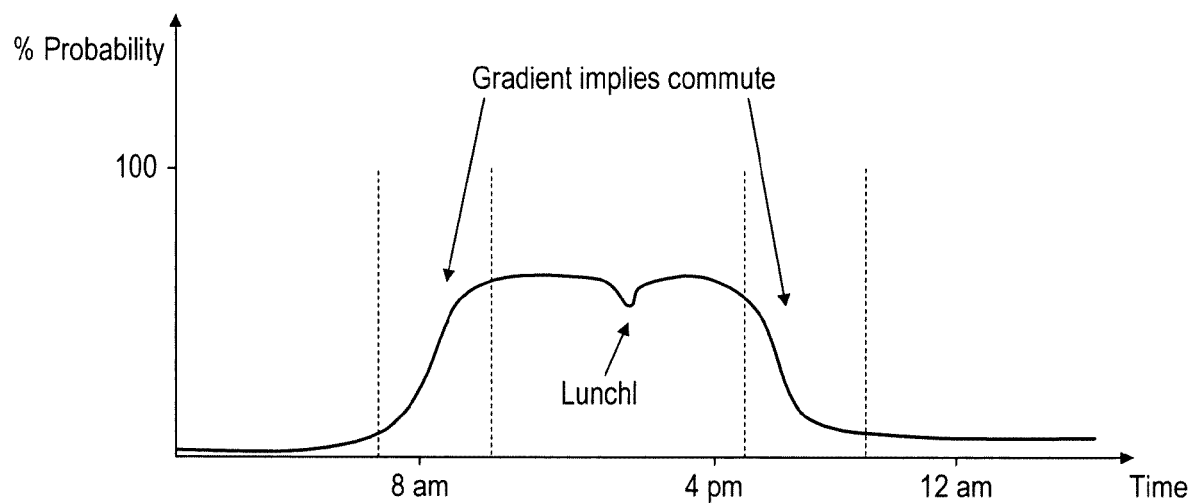
FIG. 5 is a graph exemplifying user behaviour.

For example; suppose the system guesses a context that is wrong and the user corrects this to say 'I'm travelling to work'. The system will learn from this when the user works, and when they are likely to be home and commuting. This allows it to adjust its probability graph of work/other as shown in FIG. 5.

As the system learns, it can use the gradient of the graph to infer a commute and a flat to infer time at work or elsewhere—a distinction it can fine tune from other information.

This graph becomes therefore another input to the context engine; the steepness of the line is proportional to the probability that the user is commuting at a given time and therefore weighs on the calculations performed when determining the most likely contexts.

The context engine—either the full context engine provided by module 72 or the pared down context module provided by module 52—may thus be provided on a device or on a server. The context engine receives as inputs raw context data, and generates as an output one or more contexts. A context outputted may include a label which may be used by the consumer application display 50 to display an inferred context to a user, or is used by the recommendation engine (FIG. 1) for generating a recommendation message as discussed further below.

It is important to note that the context engine does not decide what content is relevant within a given context. It just provides an assessment of the likely contexts which can be used as inputs to the recommendation engine 10.

As shown in FIG. 1, the context engine module 24 provides an output to the recommendation engine module 10, and the recommendation engine 10 provides a recommendation to the user (via the API 8) which is based on the output of the context engine module 24.

In summary, the context engine module 24 receives raw context data, and generates an output which is one or more inferred contexts. This output is received by the recommendation engine 10, which generates as an output a recommendation list for the user.

As noted above the context being used may be displayed to the user, and this display may comprise a display of an ordered list of all the inferred contexts. The context being used will be the context at the top of the ordered list. The user may change the context by selecting another context from the ordered list.

No one sensor provides a definitive answer about any context. For example (the following is not an exhaustive list):

being at work is determined by: time of day; previous days commutes bracketing a period of being roughly within a particular geofence; the presence of co-workers nearby; the identity of a work WiFi network.

being on holiday is a function of: a lack of calendar appointments; a period of offline time during a journey; a change in time zone; a change in sunrise/set times as judged by the ambient light detector; the absence of proximity to a work laptop.

being out with friends is a function of time of day; presence of friends' devices; movement constrained with a given geofence for a certain amount of time; your GPS data falling within an area containing entertainment venues rather than industrial units; frequency of tagged photos on Facebook etc.

being about to go on holiday is a function of, lack of upcoming calendar items, presence of new PassBook items; a change in wake-up alarms booked.

In each case, the accumulation of evidence for a given context increases its probability, but no one piece of information decides a context definitively. The process is a best effort attempt that is fine-tuned by a comparison against anonymous data from other similar users and by user feedback and machine learning derived from this.

As discussed above, a context is derived: in part from context data received from device sensors (location, time, network connection type etc. . . . ); partly from historical data (what to infer from sensor data, what type of place the user might be in at a given time, typical working hours for the user etc. . . . ); and finally also from other devices (e.g. who else you are with, are you surrounded by people you do not know such as in a bar, concert, tube-train etc. . . . ).

The following discussion relates to the nature and format of context data as a context vector. A context can be viewed as a collection of input data and a vector of derived, processed output data.

Elements of this vector might be of a range of different variable types from continuous (e.g. time of day); discrete (e.g. day of week) to categorical (e.g. at home, at work, commuting to work etc. . . . ).

A context is an assessment of the likely meaning of the input context data, but unless explicitly acknowledged and approved by the user it is only an approximation. As such, any statement of context would normally be associated with the input context data on which it is based so that further offline analysis can be done on it to improve future assessments. Likewise, when the user does explicitly approve the assessment this signal can also be used to improve future assessments.

A context is an instantaneous capture of the user's predicament at a given moment. This is distinct from a typical profile of a user which simply collates preferences rather than context-based trends.

An example of a context vector might be:

Context={location; motion; place; time; network; user; enumeration of nearby devices; temperature; altitude; current activity; pending activities}.

The parameters within this context vector definition can be understood as follows.

Location:

Where is the user right now, their longitude and latitude.

Motion:

The user's velocity (i.e. speed and direction) together with their type of motion (e.g. walking, running, car, train etc. . . . ).

Place:

At work, at home, at the shopping mall, in a favoured coffee shop, on a train. Note that places are not simply a look up of what's at the user's current location. If a user is driving past their place of work at the weekend, or walking past their favourite coffee shop on their way somewhere else, they would not think of themselves as being at either place. A place is a venue the context engine believes the user to be at and is a function of location together with other metrics.

For example: if the location suggests a user is at work but in fact he is in a car moving at 30 mph in a direction away from work and it's a weekend, then the system would not indicate the user as "at work". On the other hand, if a user is on foot approaching their place of work after a train or car journey and it was 8.30 am on a weekday then it would be configured to assess them to be at work.

So the variable "place" is a function of several other input context data, including other variables that may be in the context vector such as location and motion.

Time:

The date, time and time zone of the user.

Network:

Connection type (3G, 4G, WiFi, Wired), IP address (which the system might use to check if a user is on the same WiFi network as their home STB to deduce the user is at home).

User:

A statement of who the user is (e.g. user ID).

Enumeration of nearby devices:

A list of devices (see for example, Device x, Device y in FIG. 2) detected by the user's current device together with assessments of relative distance based on signal strength. These might include a large number of previous unknown devices (suggesting the user is in a busy train, if the velocity also suggests this; or at a concert if the time of day and a motion type of on-foot suggests it etc. . . . ); with a small number of known devices (at home or at work for example); near known iBeacons that can be used to determine location within buildings etc.

Temperature:

The detected temperature.

Altitude:

Often this is detected indirectly via a barometric measurement. This can be used, together with particular accelerometer patterns, to determine a flight in progress since cabin pressure changes occur in a well-known way.

Current Activity:

Running, walking, relaxing, watching TV, eating, sleeping, commuting. Mostly derived inferred from other sensors and data sets.

Pending Activities:

About to go on vacation; a commute expected. These are deduced from previous patterns or other data sources but useful for pre-empting other activities such as downloading the user's usual podcasts before the commute starts or offering movies to download and watch while flying off on holiday etc.

Figure 6:
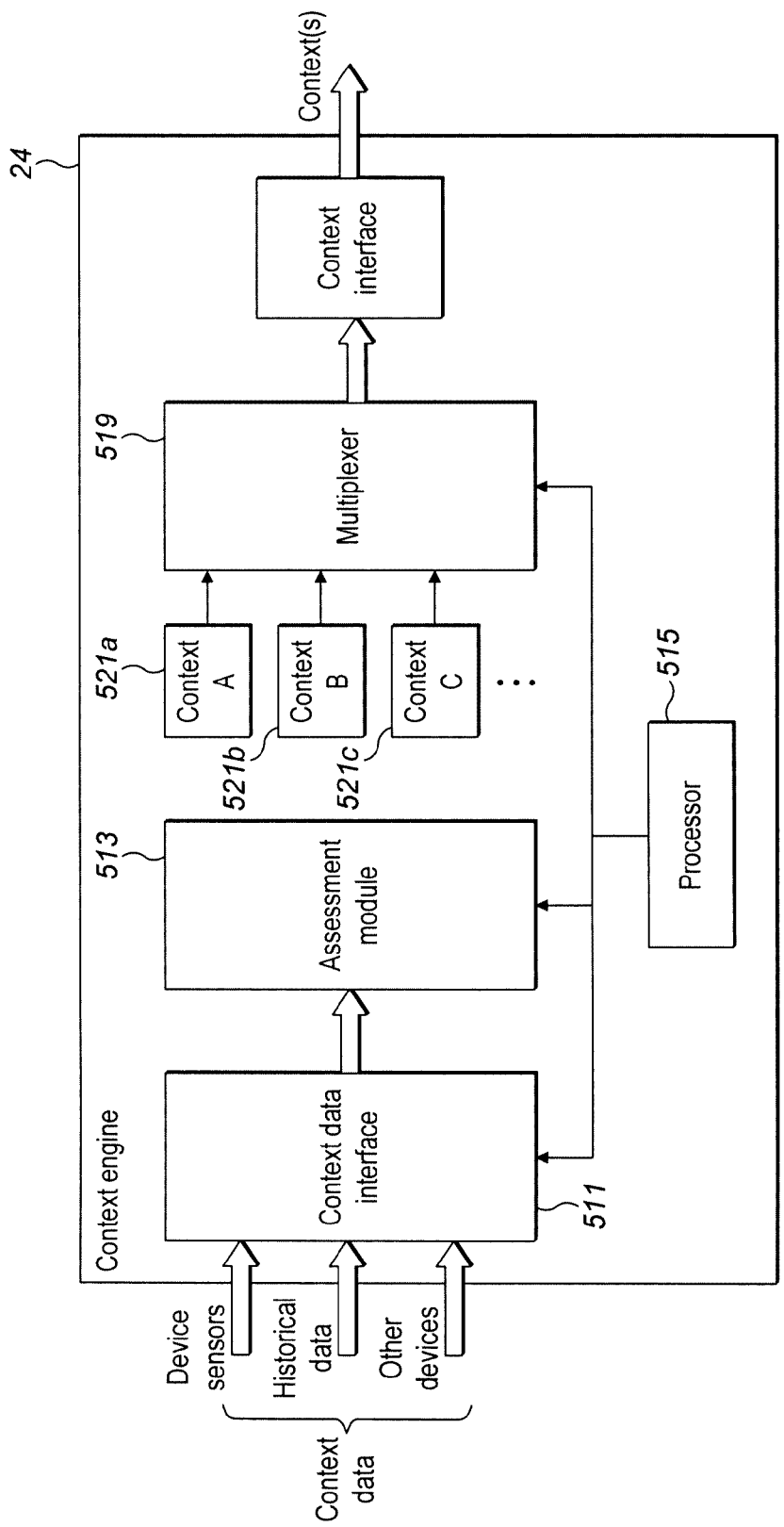
FIG. 6 illustrates an exemplary context engine.

FIG. 6 illustrates an exemplary context engine module 24 in accordance with the above description.

The context engine module 24 includes context data interface 511 which receives context data. The context data, as noted above, can include context data from device sensors, context data which is historical (from stores), and context data which is data from other devices, and summary data which is from this user, other users, or groups of users.

The context data interface 511 provides the various received context data to an assessment module 513, which assesses the received context data associated with a given user, and in dependence thereon selects (by inferring) a context for that user. In the figure, three contexts A, B and C are illustrated, denoted by reference numerals 521a, 521b, and 521c. Based on the assessment of the context data, the assessment module determines the context of the user to be one of the contexts A, B or C, or possibly more than one of these contexts.

A multiplexor 517 is controlled to connect one or more of the contexts A, B or C to the context interface, and the thus determined context output from the context engine 24. Where the context engine 24 provides multiple contexts, these may be provided in an appropriate context message, with the message including also some indication of the ordering of the inferred contexts, i.e. in what priority they are considered, with the display of a user device displaying the contexts in this order. As noted above the content delivery system may define the context based on the first context in the list, but this can be adapted based on user feedback—e.g. if the user deletes that context, the second context in the list is then defined to be the user context.

The technique for indicating a sequence in a message as discussed further hereinbelow may be utilised in such a message. The context data interface 511, the assessment module 513, and the context interface 519 may be controlled by a processor 515.

The foregoing has described how a context engine may infer a context from context data. There is now described how a recommendation engine may generate recommendations using the inferred context. The context may be derived using the foregoing techniques or using some other techniques.

In described examples recommendations are made based on the context of a user. The context of a user defines user behaviour and provides insight into the kind of asset which a user may prefer in that context. The context can be time of day, available time, location, device type, etc. Either or both of content and type of asset can vary with context.

In examples the context can be used to recommend content to a user or to recommend activities to a user.

Typically, any engine that provides content suggestions, ranked by assessing relevance, can be described as follows in a first statement:

$$R=f(L,p(U),h(U),n(U,A))$$

Which can be read as: Recommendations are a function of the Library of content available, the profile of the user, the history of the user, and the network of relationships that exists between the User and the full (entire) Audience.

This declaration understates the complexity of what the network of relationships means in practice and says nothing about what the user history is or how it is compiled. Likewise, it makes no assumptions about exactly what is stored in the user profile.

Simplifying the definition in this way serves one purpose: it illustrates that it is necessary only to identify the user for whom recommendations are required in order to generate a result-set. There is no context input upon which to vary the response.

A context sensitive recommendation system can be described as follows in a second statement:

$$R=f'(L,p(U,C),h(U,C),n(U,C,A))$$

Reading this through again it can be seen that Recommendations are a different function of the Library of content available, the profile of the User given their current Context, the history of the User weighted for relevance to their current Context and the network or associations appropriate to the current Context between the User and full (entire) Audience.

Certainly, the first and simpler statement could describe a system that tracks which recommended items receive positive feedback by time of day, and use this to inform future requests. Time of day is just one element of context. After all, users do not always do the same things at the same time every day.

What is important about the second statement is not simply that it gives the engine the ability to track a user's feedback to recommendations according to their context. It is also an opportunity to know the context under which recommendations are required in the first place.

The two statements above, which have been construed by the inventors to define the difference between non-context-based and context-based recommendations, share some similarities. While f( ) and f'( ) are defined to be different functions, it is possible that they could in fact be the same function. They both accept the same kinds of data, albeit differently filtered and weighted first.

In the following description a custom made context-based recommendation engine is described, but it will be apparent from this analysis that it would be possible to wrap or modify an existing engine of an existing recommendation system. There is an advantage in that existing recommendation systems have a wealth of sophistication to match content with users. This can be retained while adding complexity on top of it. Existing recommendation systems may not offer this kind of direct access to their matching routines by default. However, if this access is permitted then it is possible to adapt the surrounding functionality to feed in the required data suitably weighted, filtered and modified according to context. This allows the core content scoring and matching functions to remain largely unchanged.

Figure 7:
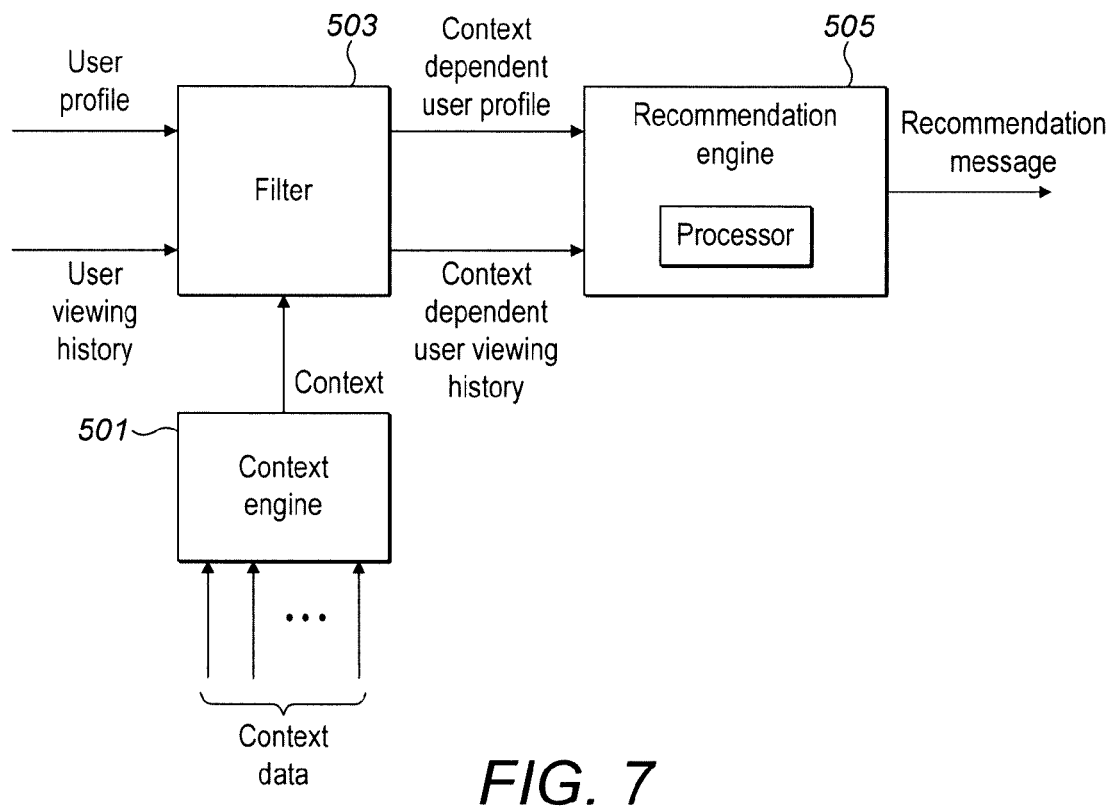
FIG. 7 illustrates an exemplary modification to a recommendation engine.

FIG. 7 illustrates an exemplary implementation of a wrap or modification to an existing recommendation engine of an existing recommendation system. As shown, there is provided a filter 503, a recommendation engine 505, and a context engine 501.

The recommendation engine 505 may be any known recommendation engine. Such an engine is known which receives as inputs the currently selected user profile(s), or sub-profile(s) containing user preferences, and the user viewing history for example. Known recommendation engines may also receive other inputs, and these inputs are identified for the purposes of describing an example.

In accordance with this example the filter 503 is provided to receive the inputs which are normally received by the recommendation engine. Thus the filter 503 receives the user profile and the user viewing history.

The context engine 502 generates a context from context data as described above. Thus the context engine 502 receives context data, and generates a context. The context data is, as described above, context data provided by sensors associated with a user device, sensors associated with other devices, etc.

The context generated by the context engine 501 provides an additional input to the filter 503. The filter then filters the received user profile(s) and viewing history in dependence on the context, and generates context dependent user profile(s) and context dependent viewing history as inputs to the recommendation engine 505. The filtering of the user profile may be to select subsets of preferences stored in a profile or sub-profile according to context.

The recommendation engine 505 is unaware of this filtering step, and performs its normal functionality on the received inputs. The received inputs have, however, been modified in dependence on context.

The recommendation engine 505, being a known recommendation engine, generates a recommendation message in the usual way.

Thus, the arrangement provides a wrap or modification to an existing recommendation engine, to allow context to be used to generate a context dependent recommendation message from an existing recommendation engine.

In the foregoing, it has been described that context is used to enhance the recommendation of content. However in general context may be used to enhance recommendations, whether of content or otherwise.

In general a recommendation message generated by a recommendation engine consists of a collection of actionable items each of which comprises an action and an object of that action which can also be referred to as a content item. Such a recommendation message may offer recommendations that incite a user to watch or otherwise consume an item of content, but other actions could also be suggested. An activity is a special case of an actionable item, which may have an action but no object, such as: "Go for a run!" With reference to the definition of content item, it can be appreciated that an actionable item may be used to collate a number of recommended items into a single tile for display, with the action being to 'drilldown'.

While the most common way to interact with an item is to watch it, there are other actions which may be suggested instead such as to rate or pre-order for example. A further set of actions that might be recommended to a user may not relate to specific items of content at all. Such an action is known as an activity.

Activity recommendations may encourage users to perform some objectless action within the system (e.g. to add more detailed information to their user profile), to launch another application in order to complete some external action (e.g. read emails in the user's email client application), or perform some action (e.g. walk the dog).

Participation in an activity of any type may often cause the user's context to change. If the user goes for a run then their context, and the system's assessment of it, would be changed as a result.

Since an activity is not a tangible piece of consumable media, it is incapable of being described in any other way except by reference. As with a content identifier, the format may be any text string that the computer system defines as valid.

Whatever the format, the purpose of the identifier is to allow any component of the computer system's software to look up any additional information about the activity as needed. It is also a short-hand way to refer to the activity itself.

For example when a recommendation engine wishes to communicate a recommendation system for the receiving user to perform a particular activity it would convey this by including the appropriate activity identifier in the recommendation message. Should the software on the user's device wish to access further information about the activity, such as the icon, title, and so on, then it can use the activity identifier to look up either from an internal database or by using an interface of the content delivery server.

In this way, no communication bandwidth is ever wasted by including more data than any receiving system requires.

In general, therefore, a recommendation message is generated by the recommendation server which contains at least one recommendation, preferably a set of recommendations. The recommendations may be identifiers. Each identifier identifies a recommendation. An identifier may indicate what action is being recommended for an object. An identifier may be a content identifier, identifying recommended content. An identifier may be an activity identifier, identifying a recommended activity.

In the described examples, context may thus be used in order to enhance the recommendation of content or to enhance the recommendation of activities which may be provided by an existing recommendation system.

The term 'content items' used herein denotes items of content, such as videos and linear content (LC) programmes which a user consumes, or which can perform as part of activities based on applications which a user engages with.

A Uniform Resource Locator (URL) to a content stream may be an object for an action, or there may be provided an instruction to access a service of a particular type. That service could include email. For example, in the morning, while watching news, the application may indicate new emails coming in and provide an easy access to have a first quick check on the emails, through a link offered to the user on the display. However, in a different context (for example, when a user is watching a movie on a Sunday afternoon with the whole family), it would not be desirable to indicate new emails or offer this indicator.

While an email application is one example of a kind of application that could be offered, other applications associated with an activity rather than content are possible (e.g. games, Skype, Spotify). More generally, the system could offer a "placeholder" activity indicator for third party applications that could be emails, games, etc. Third party applications are incorporated within the recommendation message when it is indicated it might be preferable to switch to the third party application due to the context.

In an example the system could provide a tile with an activity indicator selectable by a user to engage with the activity, or may automatically launch the activity on a tile on a display.

The system could work in the opposite way, that is, to inhibit launch of an application in a certain context. An example use case is as follows.

The context has indicated that a user would like to check generally in the morning if any Skype messages came in during the night. The system knows that and launches the Skype application indicating the number of incoming messages and also displays messages itself when they come in as a standard feature of the Skype application.

Now, a bit later the user uses their device in the presence of business customers in which situation it is not desirable to indicate and to show messages from colleagues and other contacts to the group of customers. The system inhibits therefore the indication of new messages and also inhibits the pop-up of the message itself, as it recognizes a different context, e.g. due to multiple unknown WiFi networks and Bluetooth devices after being constantly at one location.

In summary recommendations can fall into two categories: (i) content on which to perform an action, such as watch, read, rate, comment, e.g. content to watch is content for consumption such as video, LC, news, Twitter, Facebook, etc. on one hand; and (ii) an action to apply, e.g. to engage with, such as email, games, 3rd party applications etc. on the other hand.

For content items within the first category, metadata and other forms of information on each individual item is used for the benefit of the recommendation engine to select items within one type and/or across various content types for a given context. For items within the second category, individual content items are not analysed (for example individual emails) but the recommendation engine infers from a context (learnt or set by default) that the user wants to engage with the activity (e.g. an email application) and/or perhaps with concrete items of a content type (e.g. a certain game, which the user likes to play when he went home after work).

In this description, the features of the recommendation engine are described with respect to recommending content for consumption, but it will readily be understood that the same principles apply for the recommendation in general, for example the recommendation of activities.

A server can also receive activity identifiers from different sources and these activities can both drive recommendations made by the server, as well as be delivered directly to the device. Activities which form part of input to a recommendations engine can be both electronic (e.g. email or games) or physical (e.g. running or driving to work).

In summary, a recommendation message is a set of recommendations, and each recommendation includes at least one action and/or at least one object. So, a recommendation message=recommendation 1, recommendation 2, . . . .

Further, each recommendation includes an action and/or an object. Both the action and the object are optional, but at least one must be present. Thus a recommendation=[Action, Object], and may be [Action] or [Object] because both action and object are optional.

EXAMPLES

1. Content to watch: has [Action, Object] format—the action is to watch content identified by the object.
2. Content to rate: has [Action, Object] format—the action is to rate content identified by the object.

3. Email application to execute: has [Action, Object] format—the action is to execute and the email is the object.

4. Audio to hear: has [Action, Object] format—the action is to listen to content identified by the object.

5. Go for a run: has [Action] format—the action is to go for a run (no object is needed).

6. If action is default: has [Object] format—the action is default so does not need to be defined.

A recommendation message is a set of recommendations. Each recommendation comprises at least one of an action and an object such that the recommendation is that the user performs the action on or with the object.

Where a recommendation contains only an object, the recommendation is to consume that object is a way consistent with its object type.

Where a recommendation contains only an action, the recommendation is to perform an action that does not require an object such as to launch an external application, perform an activity within the current application or to perform an activity that requires neither, such as a real world activity like going for a run or walking the dog.

Where a recommendation contains an action and an object, the recommendation is to perform that action on that object where the action might be to rate, comment, like, share, follow, purchase the object and where the object might be a movie, an article, a TV show, a personality or news topic, a box-set of movies etc. . . .

Further, an action plus an object may launch an external application and supply a reference to the object to that application.

In the described examples there is provided an architecture which constitutes an "ecosystem" for a service provider. At present, different kinds of devices run different kinds of operating systems, and therefore any provider of content is dependent on providing content to a number of different devices. Aggregation of content such as email, weather updates, social updates and other forms of dynamic media is possible by the device, governed by the OS of the particular device. In contrast, with the principles described here in, an application is provided which runs on top of the operating system and provides a complete aggregation of content and display function based on recommendations from a server.

The server can also receive content from different content sources and these content sources can both drive recommendations made by the server, as well as to deliver assets themselves directly to the device. This allows the service provider to "shape" content which is delivered to a user as the service provider can exert some control over aggregation of the content sources as well as the content sources themselves and recommendations based on them.

Thus a computer device, such as a recommendation engine, for providing recommendations to a user device associated with a user includes a processor such as the processor of the recommendation engine 505 of FIG. 7. The processor is configured to determine a set of recommendations for the user based on a current user context. The processor is further configured to transmit a recommendation message to the user device based on the determined set of recommendations.

The processor is then configured to monitor the information from which the set of recommendations are derived. This is the whole information which is assessed for making the recommendation, and not just the information which comprised the recommendation. The processor monitors all content sources and watches for new items that are relevant to the user in their current context. In dependence on identifying a change in the information, a modified recommendation is transmitted to the user device.

The recommendation engine preferably monitor or measures the context, in order to identify that the context does not change. In dependence on the context changing a new set of recommendations may be formulated. In dependence on the context not changing, the recommendations are modified as described herein.

The information on which the recommendation is based can be any appropriate sources for providing information on which recommendations are based. This may include information provided by various content sources.

The processor may be configured to transmit a notification of the identified change. Thus when a change is identified, the processor may notify just the change.

Alternatively the processor may configured to revise the recommendation message based on the change in information, and transmit the revised recommendation message. Thus based on the change in information the recommendation process may be re-run and a new recommendation message generated.

The processor may be configured to transmit the recommendation message with identifiers associated with the recommendations. The identified recommendation could identify an object such as content and/or an action such as an action to be applied on the object.

The processor may configured to access a memory holding user profiles.

The processor may receive a context of the user of the user device, which defines one of multiple contexts of the user. The context may be selected by the user, from one of a plurality of displayed contexts. Thus the context may be controlled at least in part by the user as described above.

The user device preferably has a display and a processor which is configured to execute a consumer application which collects context data defining a context of the user device to transmit to a content display server and may control the display to display recommendations based on receipt of the recommendation message. The recommendation message may include identifiers identifying video assets.

There may be provided multiple user devices, each supplying respective context data and receiving respective recommendation messages as described above.

As discussed above, the recommendation engine 10 receives context(s) from the context engine. For example in the form of a context vector as discussed above. Based on this context a recommendation is made. The recommendation may be for assets to be displayed at the user terminal 4. The recommendation supplies information about these assets to the API 8, which formulates a recommendation message for transmission to the user device 4.

The number, content and type of asset will vary depending on the context.

The recommendation message preferably comprises a plurality of identifiers. The identifiers are preferably object identifiers which identify recommended content or a recommended activity.

The identifiers may be pointers to content, such as content identifiers, and the content not be included in the recommendation message. However in alternatives the content may be included.

The identifiers may each be associated with a weighting, with the weighting being processed by the user device receiving the recommendation message to control how the recommendations are presented to the user. The weighting may be allocated to identifiers by the recommendation engine.

In an example, the presentation of recommendations on a display of the user device may be determined by the weighting.

The identifier having the largest weighting may be displayed the most prominently, or displayed at the top of a list.

The weighting may be interpreted differently by different types of user device, or an identifier may have different weightings for different types of user device.

A recommendation message may have multiple groups with a group collating identifiers. Displaying a group on a user device causes all grouped identifiers to be displayed. Each identifier may be a thumbnail representing the recommendation message, for example representing recommended content.

Figure 8:
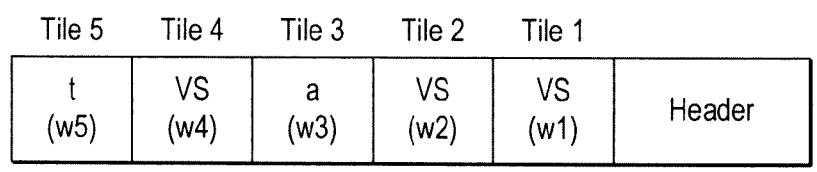
FIG. 8 is a schematic diagram of a recommendation message.

An exemplary arrangement is shown and described in which the recommendation message may comprise a sequence of asset tile identifiers presented in a particular order. In this example the identifiers are for asset tiles, but in general the invention is not limited to tiles. FIG. 8 is a schematic diagram of such an exemplary recommendation message. It has a header portion which addresses the message to the consumer application 38. After the header, the message comprises a sequence of numbered asset tile identifiers, Tile 1, Tile 2, etc., to Tile 5. There can be any selected number, n, of tile identifiers in a recommendation message.

The order of the tile identifiers may govern the manner in which they are displayed to a user at the display 46. Thus in this example the order of the tile identifiers represents the weighting allocated to the tile identifiers. The consumer application may use the order in which the tile identifiers are received to control where on the display the associated tile is presented.

Different examples of tile arrangements are shown later. The asset tiles can represent assets of different types. By way of example in FIG. 8 there are shown identifiers associated with two video short form assets (VS), a new article a, another short form asset VS and a Twitter asset t. It will readily be appreciated that this is exemplary only and a very large number of possibilities are available for the recommendation message, including identifiers for activities such as email or a particular game.

The asset tile identifiers can include content identifiers as mentioned above, and actions recommended to be performed on those assets such as watch, read, rate, comment etc. Alternatively, the asset tile identifiers can include content itself, such as news overlay or descriptive text for a content item. Such content is displayed at the user device.

In addition, each asset tile identifier includes a weighting which denotes the perceived importance of that tile identifier to the user. The weighting also governs how the tile associated with the tile identifier is displayed. For example, assets with a higher weighting can be shown in a tile of a larger size than assets with lower weightings. Weightings are not obligatory—it is possible to have a system in which weightings are not utilised, and wherein the display is controlled only by the order in which assets are received. Then the order is an inherent weighting. Each asset tile further comprises information about where the client can obtain the asset. This could be for example an asset locator for accessing the asset server 6 to return a particular type of asset from the asset server. Alternatively it could be a URL identifying one of the content sources 14 to 22 which (as described earlier) are accessible directly to the user terminal 4. It does not have to be a URL. In some cases, it may be an instruction to access a service of a particular type (e.g. Twitter or email) which the device then interprets.

A user can decide to "pin" a certain content item identifier to a certain location, e.g. a weather update is always shown in the top right hand corner. This is managed in the user profile.

Figures 9, 10:
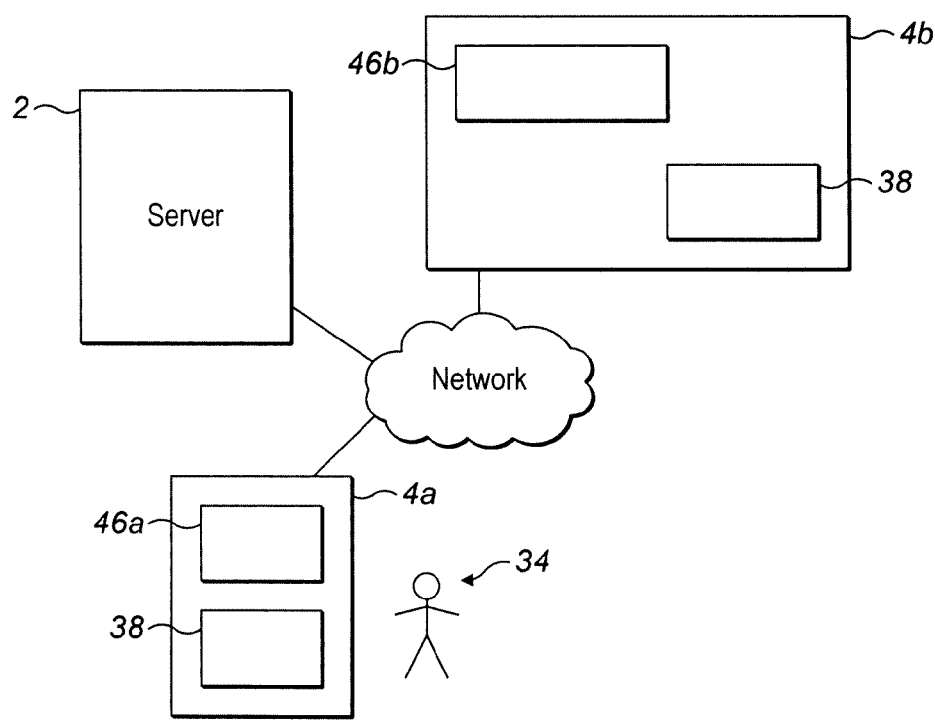
FIG. 9 is a schematic diagram of a tile in a recommendation message.
FIG. 10 is a schematic block diagram of two interacting devices.

FIG. 9 is a schematic diagram of an asset tile identifier. In particular, it includes a tile ID which indicates the tile number (its place in the sequence). In addition, it can include a location ID. Note also in FIG. 9 that the type of the asset as indicated and the URL provides the asset locator.

As described later, the display component 50 presents at the user terminal 4 a settings panel so a user can configure their context parameters. For example, they could override tile placements to replace a video with a Twitter feed output (for example), or they could select topics as part of their settings. It could include a "more like this tile", and it could allow for reordering of the tiles on their display. Tiles could also be rearranged and resized by user input at the UI 49, in a manner emulating operation.

As mentioned in the introduction, the client terminal 4 has a responsive UI which changes the layout based on device resolution (phone and tablet) and orientation. Moreover, it can include a number of conceptual representations of video navigational layouts, for example, a grid where tiles are varied based on available screen space.

In addition, the system provides a different look and feel based on various context parameters including location, time, device and available time.

Reference will now be made to FIG. 10 to describe use of the configurability of the display on the user device 4 to allow the user device 4a to control another device. FIG. 8 illustrates a first user device 4a (which can be referred to as a companion device) which can for example be a tablet or smartphone, or in any event something with a relatively small display as compared with a second device 4b. The second device 4b can be for example a TV or other large screen device, for example, driven from or incorporating a set-top box. Both devices run the consumer application 38. A network is shown by which the devices can communicate. The server 2 is also shown connected to the network. It will readily be appreciated that the network is a schematic illustration of any form of communication system allowing the devices to communicate.

In this configuration, the companion device 4a can be controlled by a user in the following way. A set of assets may be on display at the companion device 4a. A particular tile format is presented to a user. This format can be mirrored on the display 46b of the second device 4b. Thus, a user can now see on the companion device and the larger device the same display format. The user can configure the format to their taste on the companion device by suitable user input (for example, with a touch screen the user can change the size of tiles by gesture, or drag tiles to different locations). Once the user is satisfied with the new configuration this can be uploaded to the second device 4b so that the new configuration is shown on the screen 46b. Then, the companion device can be reset into an independent mode whereby it can continue to provide recommendations (recommend asset and content) using its default display configuration, or another configuration selected by the user. The other device 4b will no longer follow the configuration once the user device 4a has been put back into an independent mode.

The recommendation engine module 10 is responsive to changes in context parameters provided by the context engine module 24 to update the content/layout of the tiles in real time based on time and location (and other context parameters). Thus, the display provided to the user at the user terminal 4 will change automatically depending on the time of day or the location where the user is, or in dependence on the user manually activating different settings of his context.

The recommendation message received from the content delivery server 2 includes asset locators which enable the user terminal 4 to locate assets at the asset server 6 which are then displayed in accordance with order received from the content delivery server 2. The approach supports tiles with initial choices for 4×4, 4×6 or a freely configurable number of tiles. The order is interpreted differently depending on the type of device. Depending on number and screen size governed by the display at the device 4, rectangle dimensions are calculated. A double-click on a tile which is empty by default points to a list of sources: Internet, social media, live TV, email, other. Email is a dynamic feed (reference 26) that pushes updates every ten minutes. The tiles can be made adjustable in size by the user using two fingers.

It is intended that the size of display of the asset will be equivalent to the importance to the user, as governed by the context parameters driving the recommendation engine 10. This is controlled by the weightings.

The context engine learns from and considers the user behaviour to modify and to optimize the recommendation. Here different "inputs" (device, time, location, . . . ) are used to detect in what situation the user currently is, finally to set the best recommendation and to configure the actual experience.

The user sub profiles can allow the user to set the situation themself to get the correct recommendation related to the user mood/situation/general preferences but also to set general no-goes.

A user profile could define generally what someone likes and would get recommended but perhaps more important what someone does not want to see at all (violence, pornography, soap operas, . . . ). A user sub profile could also have the ability to allow to define different preferences related to the current situation.

Actions which a user takes when they are using one of their sub profiles does not affect recommendations when using another of their sub profiles, unless they specifically request that the sub profiles are modified together.

Note that the content delivery server updates any of the users/connected devices of a given profile if just one of them senses a different context. If a user carried their smartphone and their tablet, but only the smartphone detects a change in context, nevertheless that change in context can be updated also for the tablet. When the user starts using the tablet, the context is updated on that device as well, and also for example, on the television at home.

Notwithstanding this update, note that all the devices could show the same or different content depending on the settings on each device.

Consider somebody
  Who is on vacation where he might have real different interests and focus compared to his Monday morning week start—when he usually have to get the train at 7 am
  Who is on sick leave so that he also want to get more entertainment but simultaneously has to get updates related to his work to a certain extend
  Who has a user subscription that is usually used by the whole family so that kid content is one of the main requests—but perhaps sometimes he is also using this profile just for himself so that he don't want to get the usual "family preferences recommendation" but something different . . . .

An important feature of the application is to have the capability of general settings, that have direct applicability to the profile but also to have sub-profiles to select by the user that consider different situations where a user has different preferences. All this helps to optimize the recommendation and to speed up the learning process of the recommendation engine but also supports the recommendation and the respective learning process to focus on the right spot/situation and not to get distracted and interfered with by the fact of "different preferences" at different situations which are not already being detected by the several input mechanisms (shown in FIG. 3).

The weighting may be used in addition to an ordering.

In described examples a navigation paradigm is presented that breaks from the norm of a traditional navigational paradigm. For VOD (video-on-demand) content this is typically static poster images with associated metadata, and for linear channel (LC) this is a traditional EPG (electronic programming guide).

According to the described examples, a navigation paradigm is based on user's navigating using a mosaic of tiles with video playback. The layout of the tiles can vary depending on the available screen size. For example, a 3×3 or 2×2 layout could be provided for tablets, and a 4×1 for Smartphones. For VOD content, the video displayed in the tile could be the first 60 seconds of the video displayed in a loop, and for live content it could be the actual live signal on an ongoing basis. Other features can be incorporated, such as email, chat, social media feeds like Facebook and video, etc.

There is provided a user device including a processor configured to: receive a recommendation message; display a plurality of recommendations based on the recommendation message to a user of the user device, the plurality of recommendations having been generated, in part, on the user context; detect selection of one of the displayed plurality of recommendations; request further recommendations in dependence on the detected selection; receive a further recommendation message responsive to the request; and display a further plurality of recommendations corresponding to the further recommendation message to the user of the user device, the further plurality of recommendations having been generated, in part, on the user context and the detected selection.

Any subsequent recommendations based on a selection are based, at least in part, on the user context and all previous selections and their associated recommendations.

The processor is configured to include an identification of the type of the user device in each request for recommendations, wherein the recommendations message is generated, in part, in dependence on the type of the computer device.

The processor is configured to transmit an initial recommendations request message, the recommendation message being received responsive to the initial recommendations request message.

The processor is configured to include an identification of the type of the user device in initial recommendations request message, wherein the initial recommendations message is generated, in part, in dependence on the type of the computer device.

The recommendation messages include identifiers corresponding to each recommendation of the respective set.

The further plurality of recommendations include at least two recommendations of a different type to the plurality of recommendations. The processor is configured to display a static image responsive to the first recommendation message. The processor is configured to display a moving image responsive to the second recommendation message.

The selection is by user input.

There is also provided a recommendation server including a processor configured to: generate a first set of recommendations for a user in dependence in the user context; transmit a first recommendation message based on the first set of recommendations; receive a recommendation request including an identification of a selection of one of the first set of recommendations; generate a second set of recommendations based on the identified one of the first set of recommendations and the user context; and transmit a second recommendation message based on the second set of recommendations.

The processor is further configured to receive a further recommendation request including an identification of a selection of one of the recommendations; and generate a subsequent set of recommendations based on the selected recommendation and the user context; and transmit a further recommendation message based on the further recommendations.

The recommendations server comprises generating the recommendation messages for transmission to a user terminal of a user.

The recommendations server further includes an interface for receiving a context for the user from a context engine.

In a first context, the further recommendation is a long form version of a displayed short form video asset.

In a second context, the further recommendation is a static article, e.g. news.

The processor is adapted to transmit the recommendation message to a first user terminal associated with the user, and to transmit the further recommendation message to a second user device associated with the user.

A content delivery server also governs, in examples, how recommendation (e.g. for content items) are displayed at the client device, by not only providing recommendations (e.g. for content items) but delivering the recommendations (e.g. for content items) with an associated weighting or an ordering to the device. That ordering can be interpreted differently at different devices depending on the display resources.

Where the recommendations are for content items, the content items include not only dynamic media, but other assets such as short form and long form video assets, including video on demand (VoD) and linear channel (LC) assets.

According to a feature described herein, tiles for a specific user can be based on a recommended set of videos or channels based on user preferences and history. Recommended content is displayed in a manner dependent on the consuming device.

According to another feature, recommendations are made based on the context of a user, wherein the context defines user behaviour and provides insight into the kind of recommendation (or asset) which a user may prefer in that context. The context can be time of day, available time, location, device type, etc. set out above. Either or both of content and type of asset can vary with context.

An application (or 'app') described herein introduces a new User Interface (UI) style, in which examples use tile based navigation and present highly personalised content to the user. This content can be associated with an asset taking the form of video, written word, and potentially music. In these embodiments, video is the main focus, with support from news articles and social media feeds.

In an example, the main page of an application user interface displayed on a user device may be a trending topics page. This page presents topics of interest to a user. Each is presented as a still image with a title and sub heading. The user has the ability to enter pre-defined topics into a list in their context settings. The topics are also personalised using information from the user's Facebook feed, twitter feed, their location, and time of day, etc. Initial information gathering can be done through access to Facebook, Twitter, etc.

Once a topic has been selected, in this example a user is presented with a number of items of content relating to that topic arranged in a tile formation. The arrangement of these tiles can be specified, and numbered 1 to 9, for example. The number of tiles the application is capable of presenting is also dependent on the size and resolution of the screen being used. On a television there may be 9 items presented, with videos running concurrently. On a mobile phone there may be 1 item presented, though in both cases more content will be visible by scrolling to the right (or in any other direction).

It is intended for the application to be highly personalised. A user will have specific input, but certain elements will be learnt by the application. For example, the schedule of the user, and their viewing habits at different points in the day. The user may only ever want to read the news at breakfast, watch YouTube videos at lunch, and watch a movie after dinner. The application will respond by making recommendations (suggesting content) on topics of interest within these parameters. Of course a mixture of all types of content can be presented at any time of day. User feedback can take the form of a "don't like now" button which allows a user to defer a recommended action to another context.

Existing recommendation engines allow their decision logic to be affected by both positive and negative feedback from users. However, in existing engines, as there is a lack of context awareness, there is no real concept of a user being able to respond to a recommendation that they like but which they do not like right now. This is distinct from watch-lists and favourites feature, which require a user to decide when to pull things out of these lists.

The deferral of a recommendation is something different—it is the ability of the user to say that they like something but would prefer it in another context. The result of this signal in the described embodiment is that the recommendation engine reschedules the item for when the user is next in that context and adjusts its decision logic so that future similar items are similarly targeted.

The form of the content can be described as long-form (movies, longer television programs), short-form (YouTube clips etc.), or articles. All content can be ordered by type within the tile view. This could be done by the user or the provider. This does not change the specific content presented, simply the type. There is no content from Twitter or Facebook presented at this point, though hashtags etc. from the user's feeds will be used to determine the content presented. Once a specific video has been selected, the feed information relative to its content can be presented via a screen separation to the right or any other direction. It is then possible to move to a related article presented in the news feed, from the video the user was previously watching. In addition, dynamic content such as weather updates or social medial can be provided. Tiles can display Twitter/Facebook, etc., e.g., latest tweets from known contacts or reminders about accepted Facebook events.

Notifications will be given when new topics of interest become available. This could be as a result of a breaking news event for example. The notification will appear against the reload button in the top left-hand corner of the screen. In one example, it resembles a small blue speech bubble with the number of notifications within it. Reloading will add this topic to the trending topics page. Articles can be presented alongside the news event. The article becomes full screen text on selection.

The layout could be mirrored from a smaller handheld device used for selection (mobile or tablet), while using a larger device to view the same layout of selections (TV, computer). It could then be possible to watch an item of content on the larger device, while continuing to browse content on the hand-held device, e.g. articles and feeds. There is an option for motion gestures (some kind of swipe, two fingers or pinch), to then move content of choice from the hand-held device to the main screen for viewing instead of currently displaying content.

It is also intended for motion to be used as a discriminator for current activity to determine context. The pattern and speed of movement of the user could be used to determine whether they are driving, on a train, running, or walking. Relevant content would then be presented. These would vary from each other greatly, as one may not wish to watch a long form video on a bus trip, but may on a train journey. Also a user would not be able to view content while driving, but may wish to listen to music or news, have an article read to them, or listen to the commentary of a sports event.

Metadata could contain cues for display of promoted items within the content being viewed. For example the user is watching James Bond, and an advert for the watch he is wearing appears. The cues within the metadata could also be filtered depending on the personalisation of the application.

Emails can also be accessed.

A user can "roll forward" a clock. This would be useful in certain instances. For example the user wishes to choose or browse content they may view in the evening in advance, either out of curiosity or to make a selection beforehand. This would avoid the introduction of an anomalous event within their schedule, which could potentially jeopardise the previously learnt schedule. The same may occur if the user is ill, and therefore not at work as usual, or on holiday.

The application can allow control of the 'ecosystem' of a household service provider who already provides a content based service to that household (or community of users).

While displayed items are the main focus, the concepts described herein extended to audible output such as voice delivered email and music.

There follow examples of five user stories to aid understanding.

Story 1—Lunchtime Viewing of Short-Form, Linear News and Social Content.

Whilst at work, Mark has 30 minutes to browse the Internet in his lunch. He is interested in a short-form content appropriate to his work environment. This means being recommended short-form new items (both VOD and linear), possibly based on trending topics derived from his Facebook and Twitter feeds. Additionally Mark will want to watch the typical "kitten" videos we all share in the office.

The application can do this as it knows that Mark is at work and it knows that Mark takes a 30 minute break between 1 pm and 1.30 pm.

Story 2—Breaking News Item.

Whilst Leigh is using the client application (U-TV) 38 to browse content in his evening, a fire breaks out down town and a breaking news article trends within his Twitter feed. The client application (U-TV) 38 will now update his display to include:
 trending twitter posts for #firedowntown hashtag;
 Vine video's tagged with #firedowntown hashtag;
 Facebook feed with the #firedowntown hashtag;
 a selection of local news streams; and
 possibly additionally promoting some premium fire-related film (Backdraft, for example).

The system can do this as it integrates with Twitter and Facebook and assesses trending news articles. Keywords in news articles can be additionally used to "find" associated video and VOD content based on content tagging. Additionally the system has a hook in to Leigh's social graph and can additionally promote items based on his specifics (as in his user profile).

Story 3—Evening Viewing Focussed on Long-Form Content Discovery.

Kevin is wanting to watch television at home and loads the client application 38 (U-TV) to discover some content. The system knows that Kevin is at home and that Kevin likes to watch long-form content of an evening. The system will promote VOD content based on Kevin's previous viewing habits. The system will include trending VOD content but will not include Twitter, Facebook or any other non-video content.

The system can do this as it knows that Kevin is at home and that Kevin watches films on Monday evening.

Story 4—Evening Viewing Focussed on Short-Form and Social Content.

Sian likes to use the client application 38 (U-TV) whilst she is watching television at home on an evening. She is mostly focussed on the television but the television programming does not require her undivided attention and she casually browses the client application 38 (U-TV) to spot any short-form and social content that can complement her casual approach to watching television on an evening. The client application 38 (U-TV) listens to the television programming and promotes content based on her television programme at that time. This can be achieved where the TV feed is supplied as a content source for matching purposes.

Story 5—Evening Viewing Focussed on Short-Form/Long-Form Sports and Social Content.

Peter enjoys watching any sport in the evening although he is relatively indiscriminate in the sport that he wants to watch. He uses the client application 38 (U-TV) to surf linear streams running sports and will "zoom" in on a game when the action interests him. However, Peter is also a social hound and knows that his friends know when something great is happening in a game. The client application 38 (U-TV) displays a good mix of sports content based on Peter's preferences but additionally a tile maintains a list of sports-related content that is trending and his friends twitter posts are surfaced higher than public posts.

The application can do this as it knows that Peter is a sports fiend, especially on an evening, and he is really looking for the good bits of a game. This means short-form and highlights or a chance to jump to the hot part of a game when his friends tell him to.

There follows a description of three user cases to aid understanding:

Case 1

Figure 11:
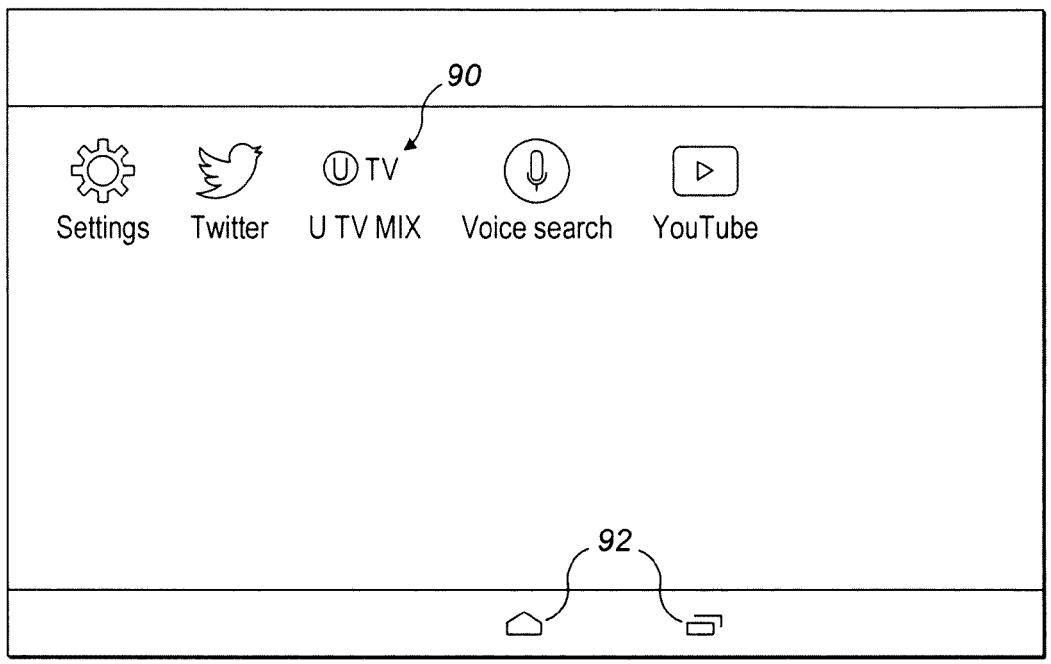

Start the application by entering into the android menu and selecting the U-TV MIX icon. FIG. 11 depicts the application menu page. A U-TV MIX application is started by selecting a U-TV icon 90 from among various displayed icons. At the bottom of the figure are the navigation buttons 92 for the device.

Figure 12:
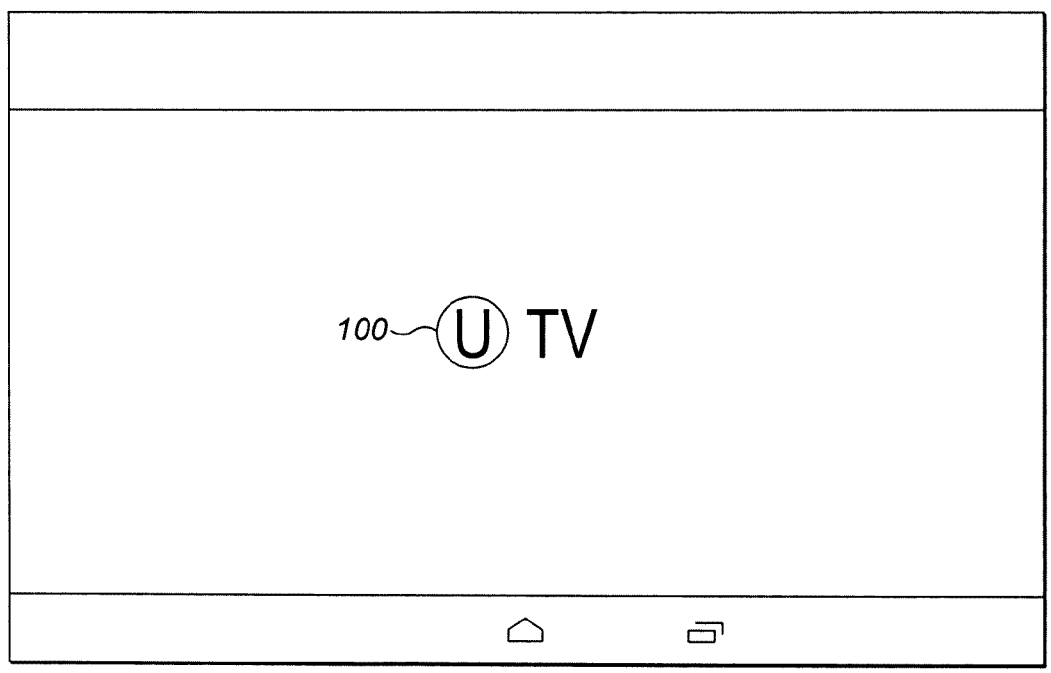

After selecting the U-TV MIX icon 90 the user is met with a loading screen, FIG. 12. While loading a blue ring around the 'U' 100 appears in a clockwise rotation from the 12 o'clock point.

Figure 13:
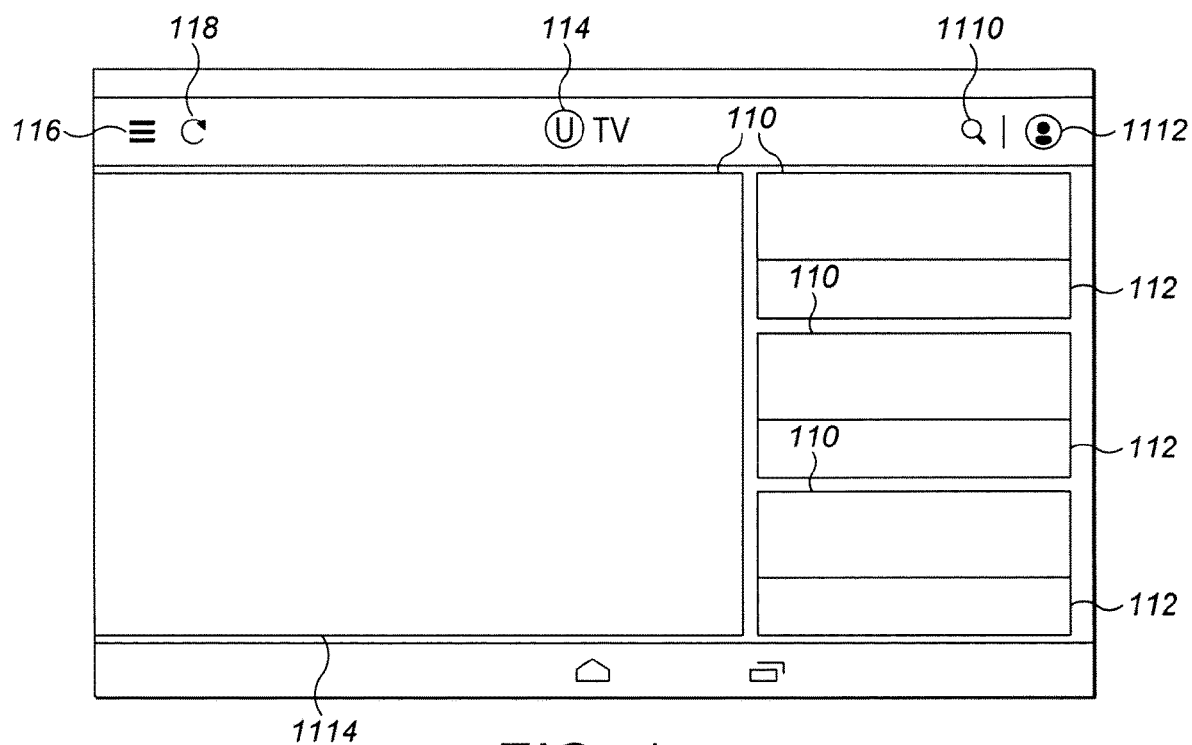

A 'Trending Topics' page is then displayed, FIG. 13. The trending topics presented depend on aspects of the user's personality. This personalisation is achieved by gaining information through various sources such as Twitter feeds, Facebook feeds, user's location, time of day at that location, etc. . . . Images are shown to represent the available topics of interest 110. The images displayed are not moving, they are representative still images. Each image has a partially transparent section at the bottom 112, where the title of the topic and a small summary of available content can be seen. At the top of every page within the application, the U-TV logo is displayed 114.

Figure 14:
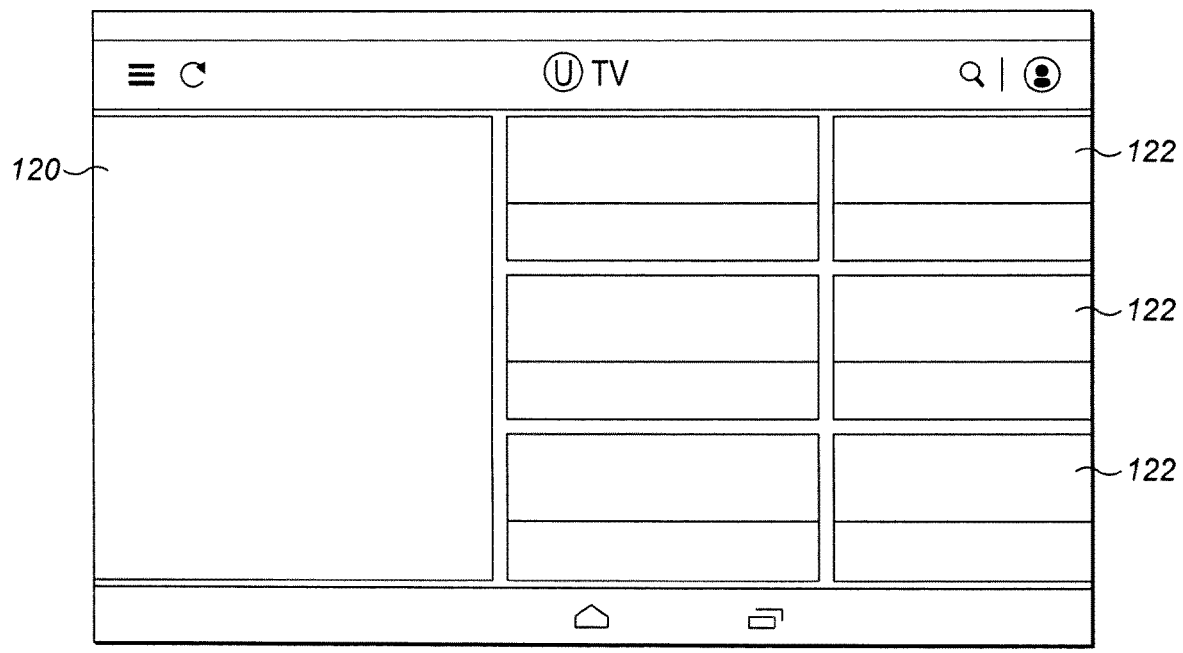

More topics can be found by scrolling to the right, as shown in FIG. 14. The number of topics potentially visible has not been defined. It is 7 here for editorial purposes only. In FIG. 14 the main topic of interest 120 has moved partially off of the screen to the left, and three new topic images have moved into view on the right 122.

Figure 15:
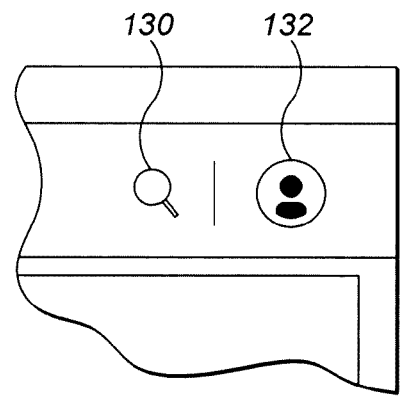
Figure 16:
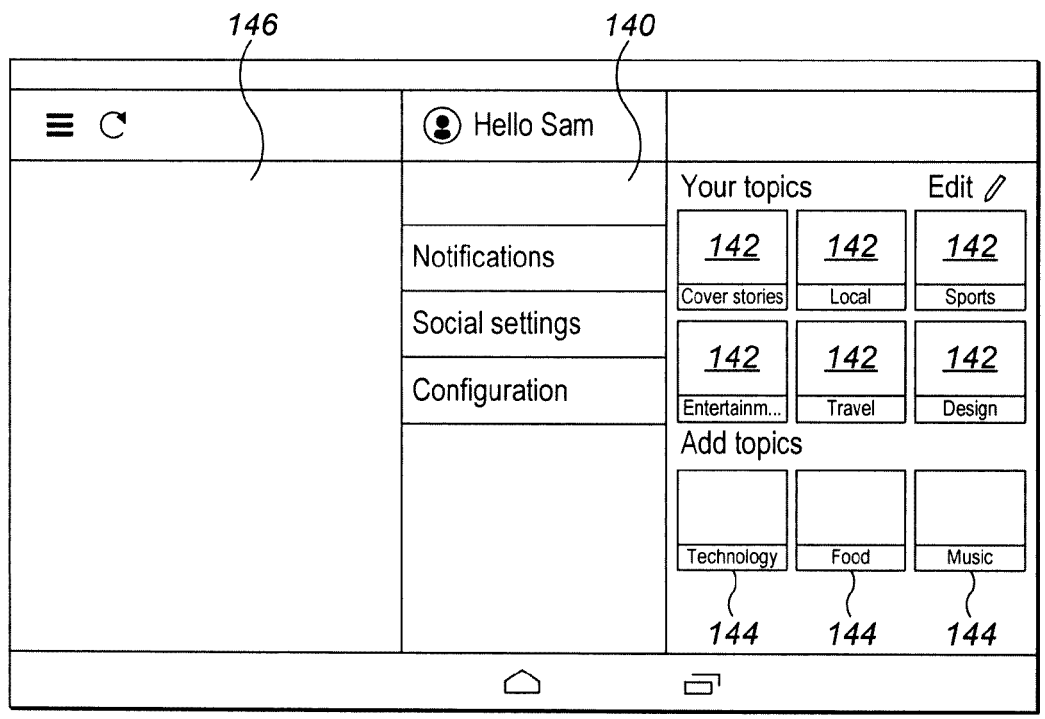

FIG. 15 shows the top right-hand corner of the page of FIG. 14. This is where a 'search' button 130, and a 'settings' button 132 are located.

Clicking on the settings button 132 takes the user to a settings page. The initial section of this is the MY U-TV page. Here the user can select certain topics of interest allowing the further refinement of the metrics used to build the trending topics. FIG. 14 shows the settings menu displayed when on the 'MY U-TV' section 140. The right-hand panel depicts the topics the user is currently interested in 142, and a selection of further topics the user may wish to add 144. While this menu is open, the left-hand panel of the screen becomes a partially transparent black, with the trending topics page 146 visible through it.

Figure 17:
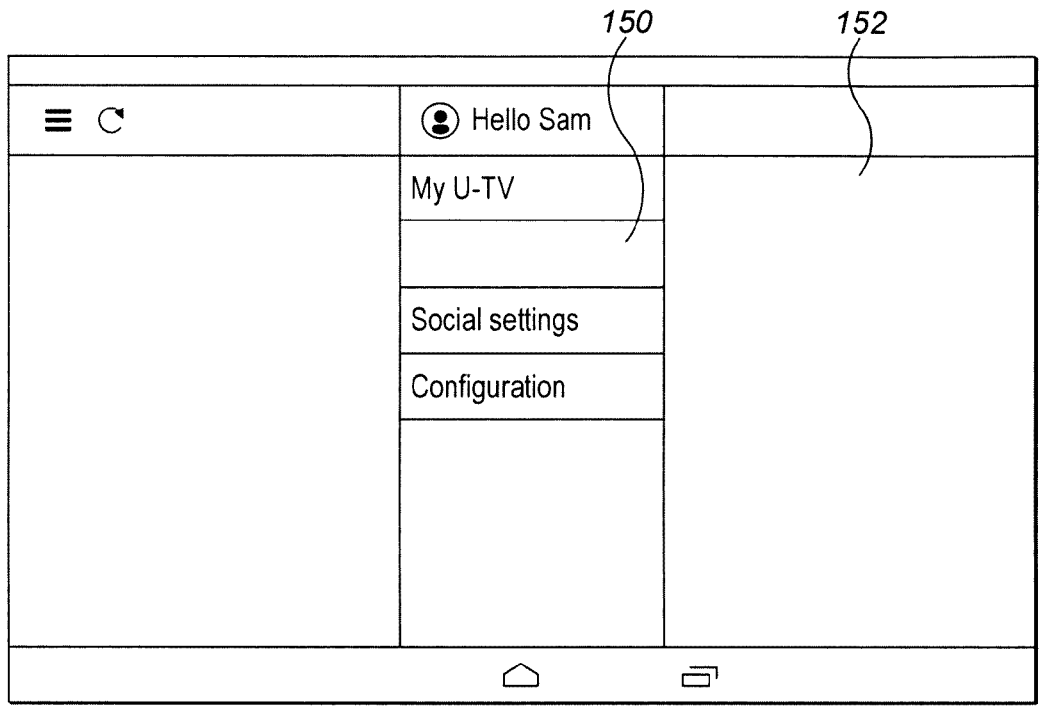

FIG. 17 shows the display after the 'Navigations' section has been selected from the settings menu 150. The right-hand panel shows notifications regarding newly available topics and updated content of current topics 152. The notifications page is intended to provide the user with alerts when new topics and new articles become available. The user will have some choice over these, for example 'I only want to see a maximum of 10 at any one time'.

Figure 18:
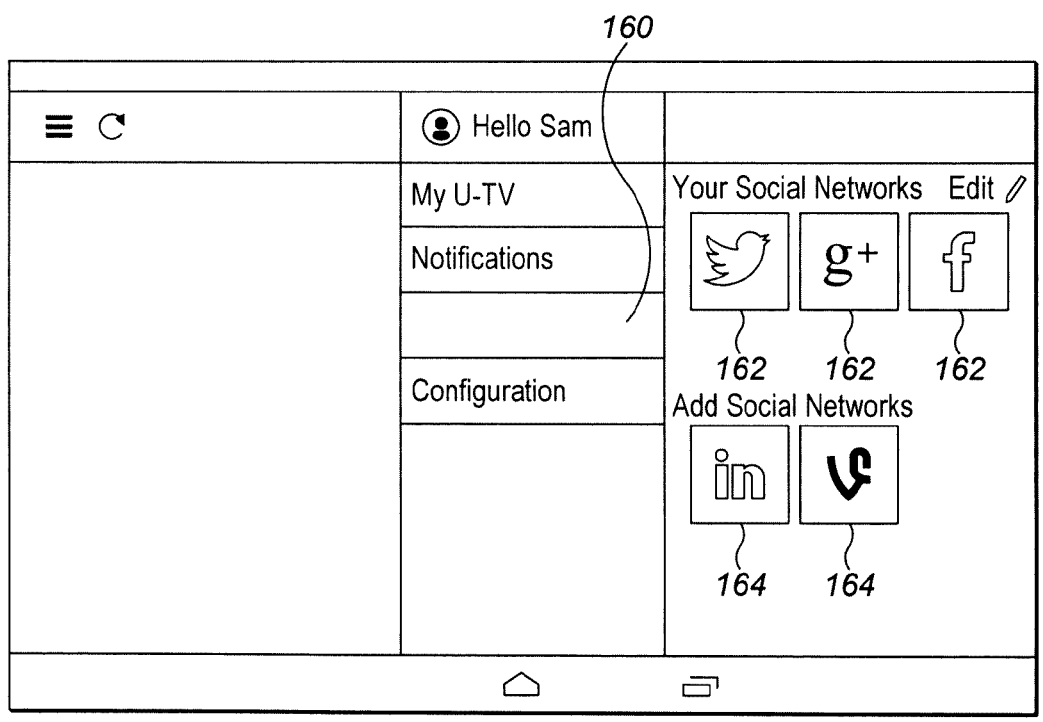

The Social Settings section is where a user logs into their social networks. It is intended to have the user also log into news sources e.g. Huffington Post, BBC News, Google News, etc. in order to pull in news articles. FIG. 18 shows the display after the 'Social Settings' section has been selected 160. The right-hand panel shows the social networks the user is currently logged into via the application 162. Bellow this other social networks that have not yet been signed into are suggested to the user 164.

Figure 19:
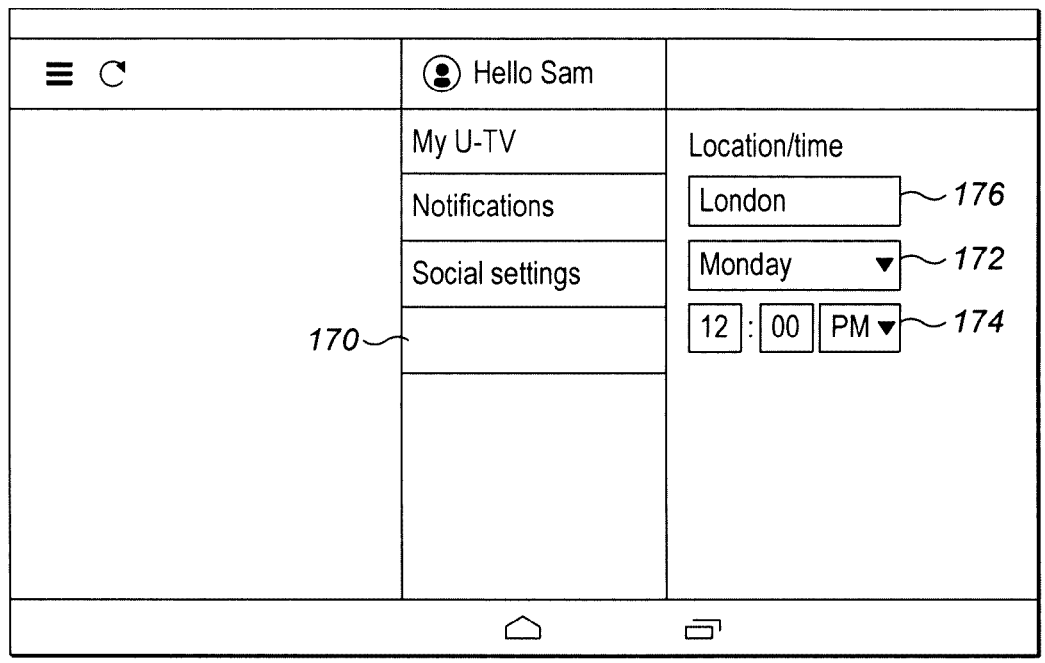

A Configuration page is the 'Cheat Key' for use in the PoC. Allowing demonstration of how the applications trending topics change when the user is at work/home, in another city/country, the weather is good/bad, etc. FIG. 19 shows the display after the 'Configuration' section 170 has been selected. This section has been enabled for setting the day 172, time 174, and location 176 of the user.

Figure 20:
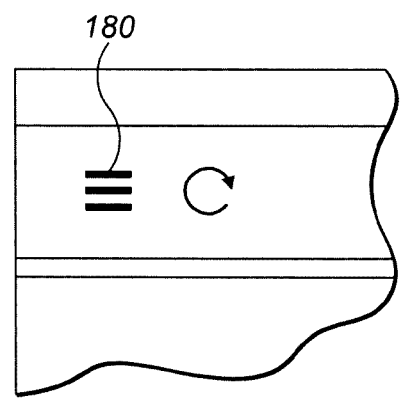
Figure 21:
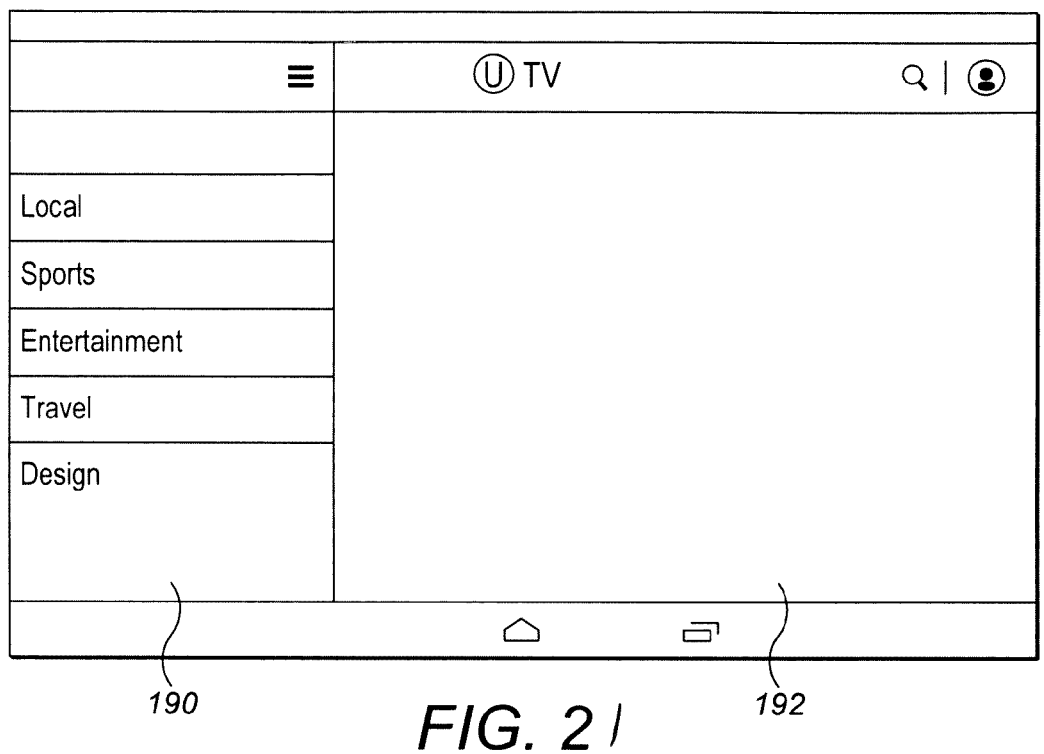
Figure 22:
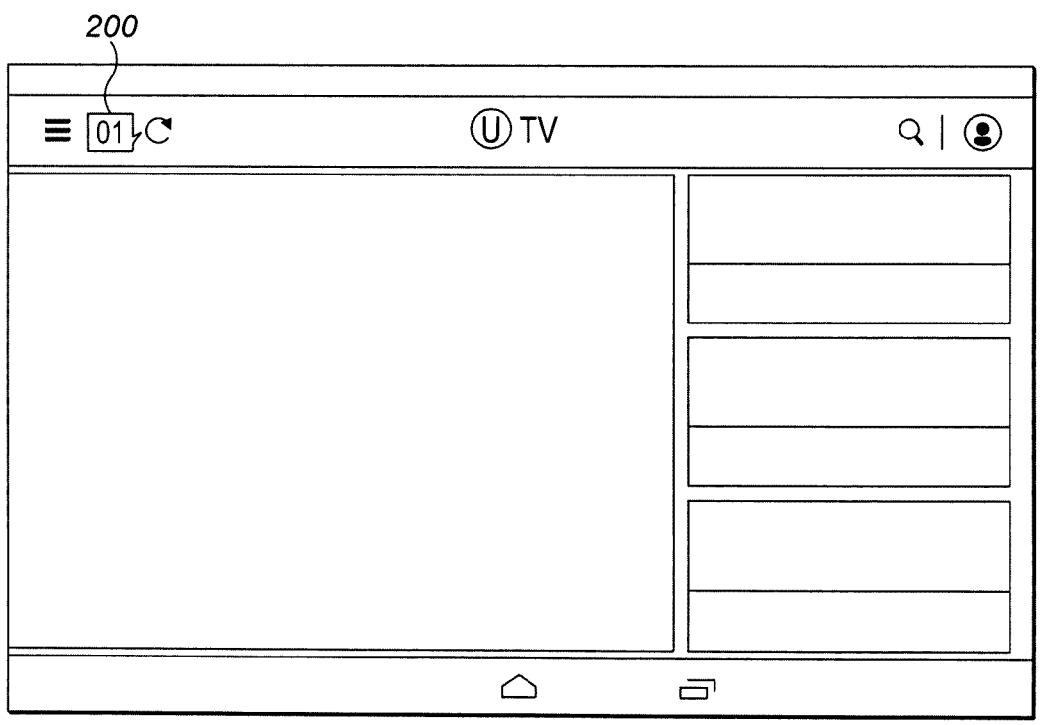

Going back to the Trending Topics page, FIG. 13, in the top left-hand corner is a hamburger menu button. FIG. 18 shows the top left-hand corner of the display, where the 'menu' button 180 is located. This menu provides the user with a slightly different way of refining the trending topics. FIG. 20 shows the display after the 'menu' button 180 has been selected from the trending topics page. The left-hand panel shows a number of options to further refine the trending topics 190. The right-hand panel now shows the trending topics through a partially transparent black hue 192.

Case 2

Begin by loading the application as before, seeing the standard loading page, the user is then presented with the Trending Topics page, as shown in FIG. 13. The 'menu' 116 and 'refresh' 118 buttons can be seen in the top left-hand corner, the 'search' 1110 and 'settings' 1112 buttons in the top right-hand corner.

A significant news story breaks, and the topics available are updated. The user is notified of this by the appearance of a small blue notification next to the 'refresh' button in the top left-hand corner of the screen. There is a single notification, therefore the number shown is 01. FIG. 20 shows a notification being received following a breaking news event. The notification appears next to the 'refresh' button 200. The notification signifies a new topic becoming available.

Figure 23:
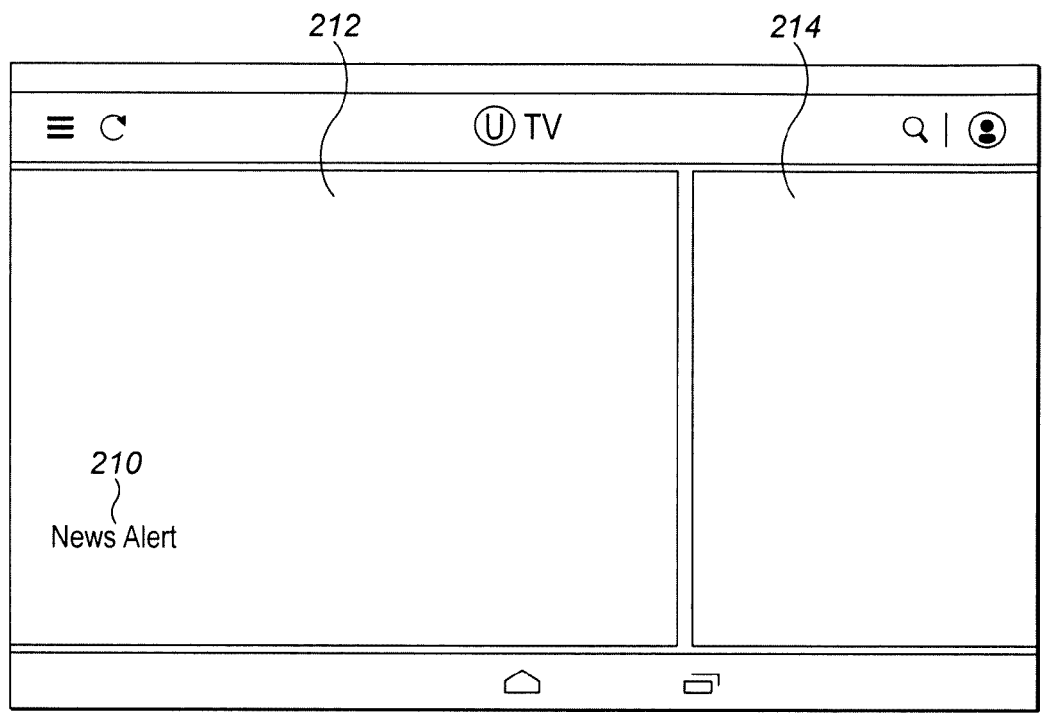

Clicking on the notification updates the Trending Topics page and the new topic is inserted into the page with a 'News Alert' 210 highlight on it to grab the user's attention. FIG. 23 shows the display after the page has been refreshed to include the new topic. The new topic 212 is now displayed to the left of the previous trending topics 214.

Figure 24:
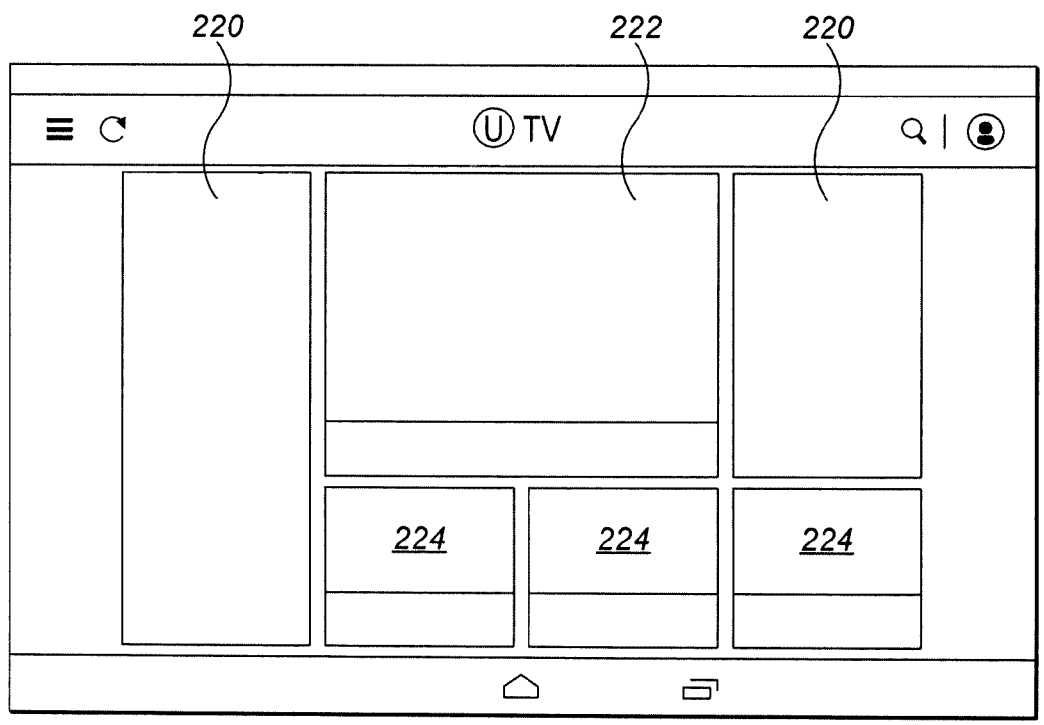

Clicking on the new topic brings up the tile display for that topic, as shown in FIG. 24. The tile display shows both videos and articles related to the news event, pulled from a number of different sources. These include You Tube videos and live broadcasts. Twitter feeds, Facebook feeds and News feeds have been configured to pick out specific news. The videos play continuously, the photos in the articles are still images. The left-hand and top right-hand tiles 220 show news articles related to the event. The central three and bottom right-hand tiles show videos related to the topic. All video content is playing concurrently. The larger video is a live news stream 222. The three smaller videos are YouTube videos 224.

Scrolling to the right brings more content into view. FIG. 23 shows the tile display having been scrolled to the right to show more available content on the topic. The previous videos and article 230 making way for two more articles and another video 232.

Figure 26:
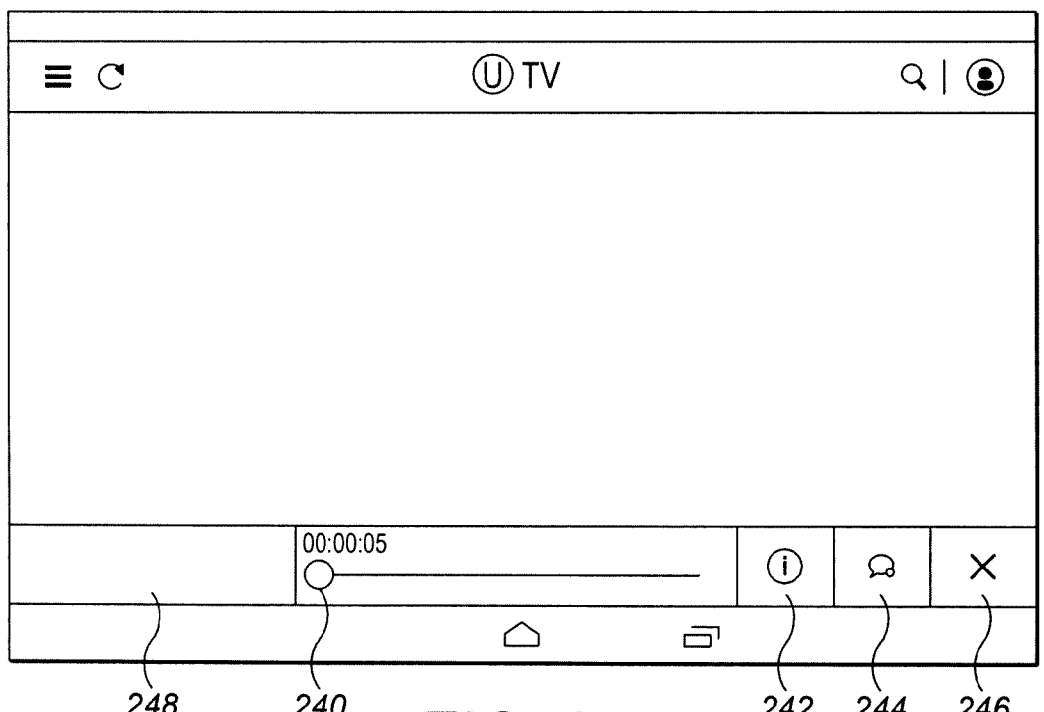

Scrolling back to the left and clicking on the largest video tile 222 with the heading 'Wildfires in Southern California . . . ' takes the user into a single item view to watch the linear stream of this video. FIG. 26 shows the display having selected the video tile. The video now fills the screen. A bar at the bottom provides the user with a 'click and drag' button 240 for navigating through the playing video. On the right of the bar are an 'information' button 242, a 'conversation' button 244, and an 'exit' button 246. The space on the left of the bar can be used for advertising 248.

Figure 25:
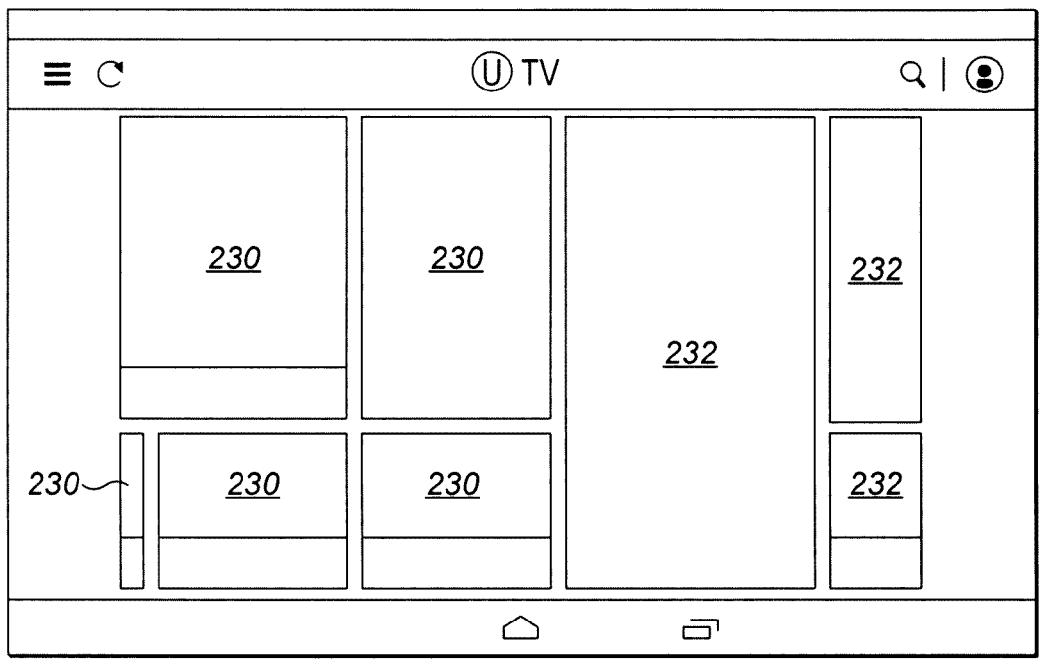

Clicking on the 'information' button 242 or the 'conversation' button 244 brings in associated content. The 'information' button brings in an informative description to accompany the video. FIG. 25 shows the display after the 'information' button has been selected. A panel on the right of the screen shows a description of the content being viewed 250.

The 'conversation' button provides the user with a selection of feeds associated with the video via news sources, Facebook, Twitter, and Google plus, etc. The user can scroll down to display more items. FIG. 26 shows the display after the 'conversation' button 244 has been selected. A panel to the right now shows a number of selectable sources of associated content along the top 260. The news feed option has been selected 262 from the four shown, and there are two news articles displayed in the panel 264. Each gives the choice of reading more of the article 266. A bar to the right of the panel shows the option to scroll down to see more articles 268.

Case 3

Begin by loading the application, seeing the standard loading page, FIG. 12, and then being presented with the Trending Topics page, FIG. 13.

The user then selects the World Cup topic 1114. The tile view of this topic is then presented to the user, shown in FIG. 29. This comprises of concurrently playing video streams and articles, each individually displayed within a tile. The video content is a mixture of live and VOD. The news article has been pulled from Google news. The top left-hand tile shows a live television stream 270. The three tiles along the bottom 272 show short videos like adverts and YouTube clips. The top right-hand tile contains a news article 274. Scrolling to the right brings more concurrent streams into view, FIG. 28. The newly visible videos are 6 short-form videos from You Tube, playing concurrently 280.

Twitter and Facebook content has not been brought in-line at this point. This has been left until the user has selected a specific item of content to view. Though Twitter and Facebook are being used to decide tile content. The live Brazil vs England feed is selected to be viewed by the user 270. The video fills the screen and a bar appears at the bottom as described in FIG. 27.

Selecting the 'information' button 242 in the bottom right-hand corner brings up a description of the video being watched, including live score. FIG. 25 shows the display after the 'information' button has been selected. A description of the video appears in the right-hand panel 250.

Figure 28:
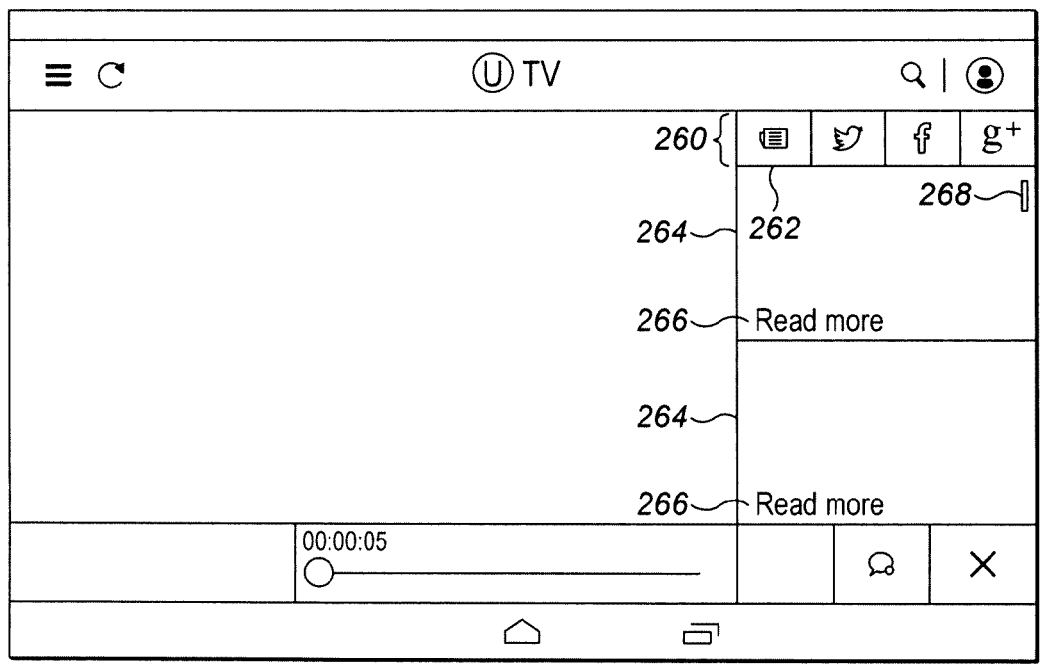
Figure 29:
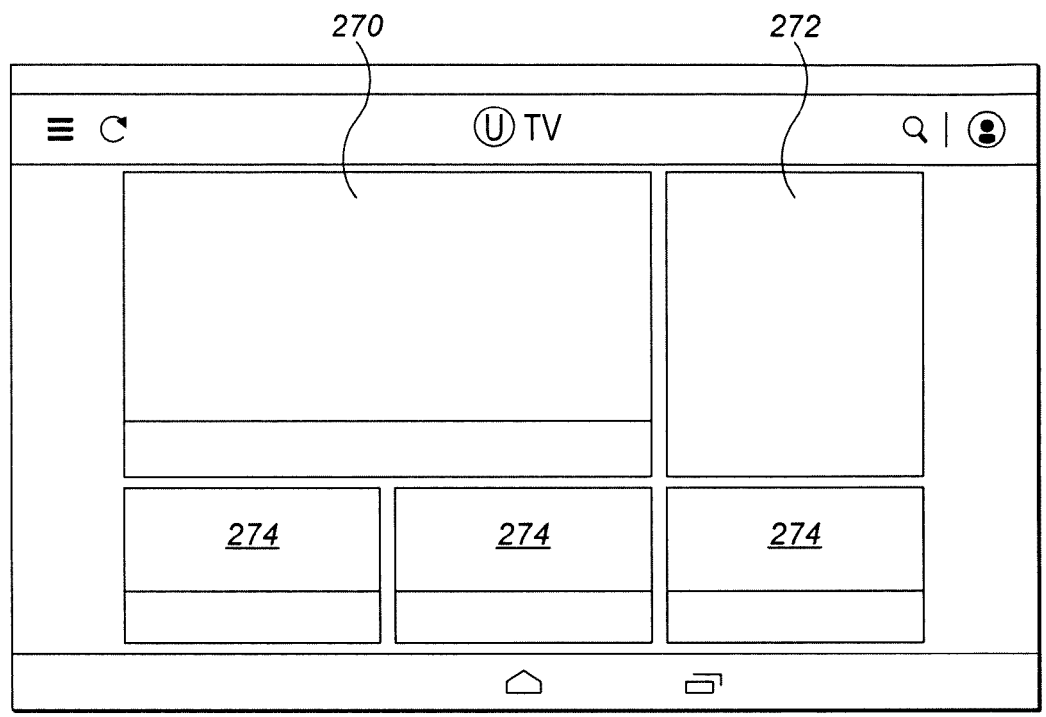
Figure 30:
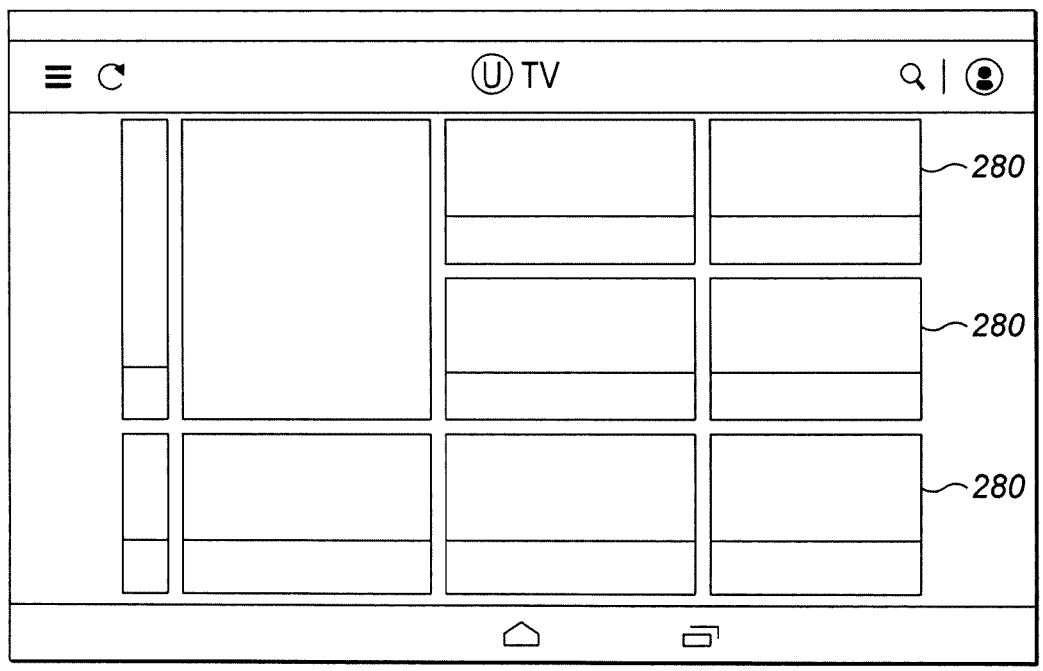
Figure 3I:
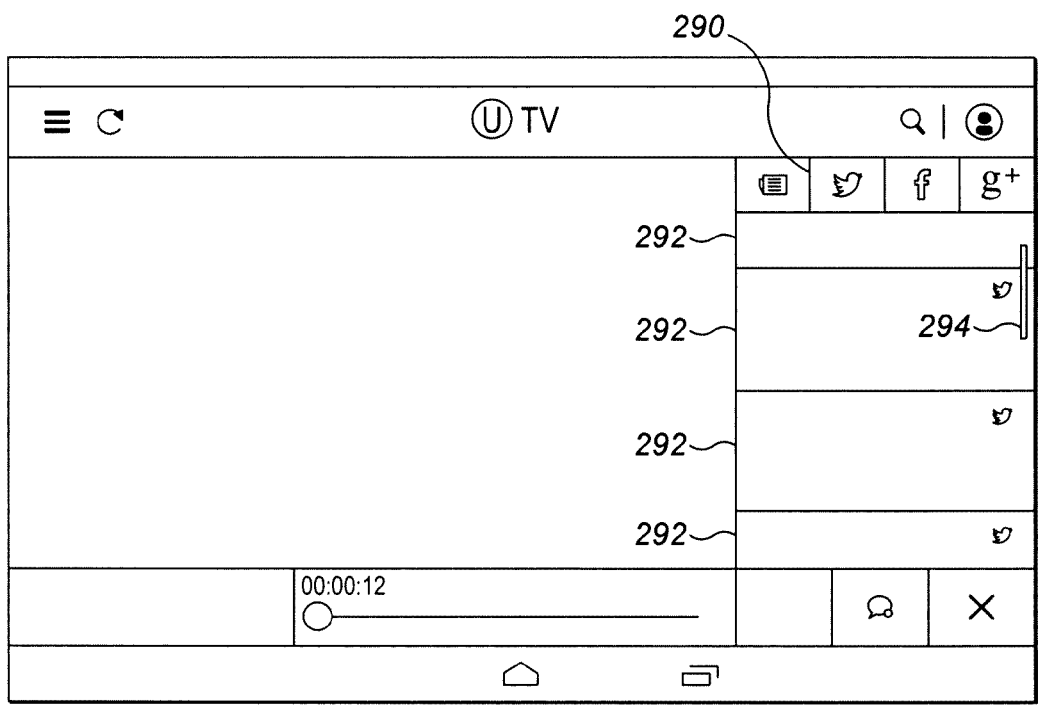

The 'conversation' button 244 allows the user to view content from news feeds and social media feeds as previously shown in FIG. 28. FIG. 31 shows the display after the 'conversation' button has been selected. The twitter feed option 290 has been selected from the four shown along the top 260. There are parts of four posts displayed in the panel 292. A bar to the right of the panel shows the option to scroll down to see more posts 294.

Clicking on the 'conversation' button 244 again removes the screen section displaying the feeds. The display is then as shown in FIG. 24.

Figure 27:
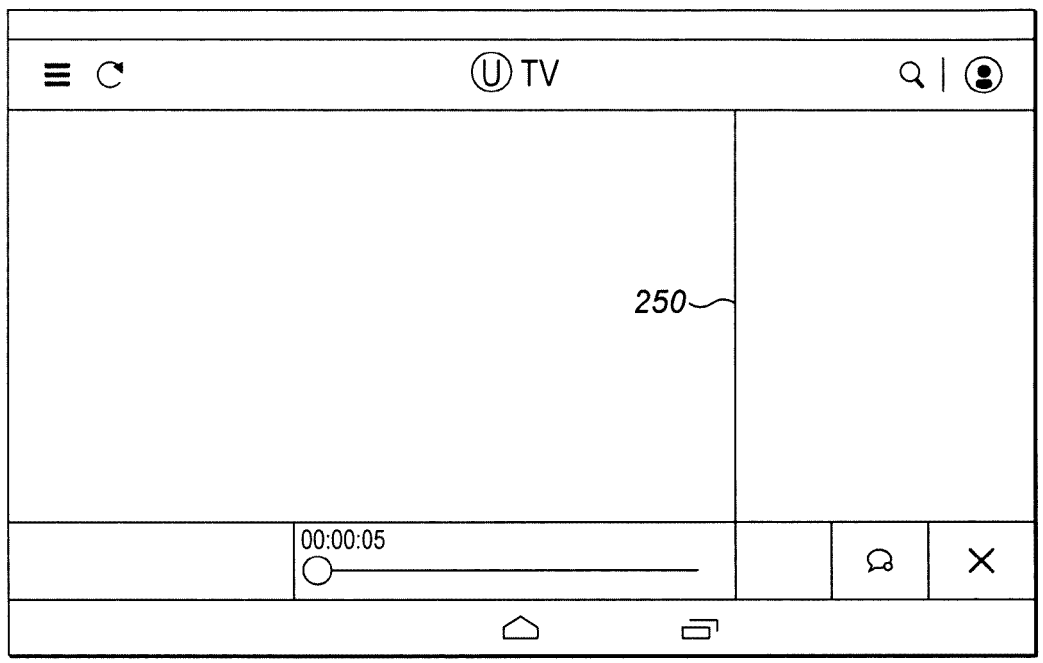

The 'exit' button 246 is then selected, and returns the user to the tile view for the previously selected World Cup topic as shown in FIG. 27.

The foregoing has described three use cases which aid in understanding.

The following sets out information about the API 8 which again helps in understanding. Tables are referred to, and each table has a heading which describes the function of the API:

Trending Topic—Table I
Recommendations and list—Tables II/III
Social Feed—Table IV Each function can be activated at an endpoint which is defined in the table. Note that for recommendations and lists multiple endpoints are possible and this has been separated into two tables, one table (Table II) relating to recommendation and list of articles, and the second table (Table III) being related to recommendations and lists for video assets. A response always contains an array of recommendations tiles.

The endpoint in Table II is a source of articles, and the parameters in the content include q-queryterm; a-numbers of articles; sv-number of short form videos; lv-number of long form videos; pid-location id; ls-location radius.

The endpoints in Table III are a source, VOD store, live feed and YouTube/vod (short form video).

When the function is implemented, the response is determined by the function name (action) and the defined endpoint. The response includes 'n' tiles, where n can include sv; a; lv.

Below the table of "Trending topic" are exemplary response items, each having a corresponding tile id equal to 1, 2, 3, 4. A response always contains an array of topics.

TABLE I

| Trending Topic | | | |
|---|---|---|---|
| Endpoint | Action | Description | |
| | | Lists Topics in the repository | |
| | | Parameters: | |
| | | Parameter | Description |
| /topic | GET | l | location id The parameter is an int value the should be between 1 and 5 to specify which user this represents for cheat purposes. |
| /topic/{id} | GET | | Gets the topic based on id |
| /topic | POST | | Creates a new Topic based on JSON payload and returns the id |
| /topic/{id} | PUT | | Updates the Topic with the given id based on the JSON payload |
| /topic/{id} | DELETE | | Deletes the topic from the list |

```
[
    {
        "id": 1,
        "title": "Tracey Morgan",
        "description": "His condition and a collection of work",
        "keywords": "Tracy Morgan",
        "twitter_query": null,
```

TABLE I-continued

Trending Topic

```
      "locationId": 1,
      "imageUrl": "http://83.98.5.9/images/topics/Layer-109.png",
      "channelImageUrl":
"http://83.98.5.9/images/tvchannels/BBC%20ONE%20HD.png",
      "publishDate": 1403622029490,
      "type": "video",
      "url": "http://localhost/poc/article?q=Tracy+Morgan&sv=10&lv=0&a=10"
    },
    {
      "id": 4,
      "title": "Apple",
      "description": "The product, then and now",
      "keywords": "Apple",
      "twitter_query": null,
      "locationId": null,
      "imageUrl": "http://83.98.5.9/images/topics/Layer-108.jpg",
      "channelImageUrl":
"http://83.98.5.9/images/tvchannels/BBC%20ONE%20HD.png",
      "publishDate": 1403528953787,
      "type": "video",
      "url": "http://localhost:8888/services/article?a=0&sv=10&lv=0&q=Apple"
    },
    {
      "id": 2,
      "title": "The World Cup",
      "description": "Live Game: Brazil vs Croatia Pele Highlights & More",
      "keywords": "World,cup,football",
      "twitter_query": null,
      "locationId": 1,
      "imageUrl": "http://83.98.5.9/images/topics/world_cup.jpg",
      "channelImageUrl": "http://83.98.5.9/images/tvchannels/ESPN%20HD.png",
      "publishDate": 1403528947388,
      "type": "video",
      "url": "http://83.98.5.9/poc/article?q=World+cup+football&sv=10&lv=0&a=0"
    },
    {
      "id": 3,
      "title": "Stanley Cup Finals",
      "description": "The games & the history",
      "keywords": "NHL",
      "twitter_query": null,
      "locationId": 1,
      "imageUrl": null,
      "channelImageUrl": null,
      "publishDate": 1403528809707,
      "type": "video",
      "url": "http://localhost:8888/services/article?a=0&sv=10&lv=0&q=NHL"
    }
}
```

Below the "Social feed" Table IV a sample response lists a number of different articles from the source "article" and postings from the source "Twitter" all sharing the subject content "Tracy Morgan". Note that the items returned from the source "article" have a specific URL associated with them to allow the user terminal to access these articles from the article asset server itself. Postings from the Twitter source which are returned in the response do not have a separate URL—instead they are taken directly from the Twitter source to the user terminal.

TABLE IV

Social Feed

| Endpoint | Action | Description | | |
|---|---|---|---|---|
| | | Lists Video tiles based on a search term, number of tiles specified by parameter n | | |
| Parameters: | | | | |
| | | | Parameter | Description |
| /social | GET | | q | query term for news search |
| | | | t | query term for twitter search. |
| | | | n | number of items from each source |

TABLE IV-continued

Social Feed

```
Sample Response
{
        "recommendations": [
                {
                        "url": "http://www.imdb.com/name/nm0605079/",
                        "title": "Tracy Morgan - IMDb",
                        "providerImageUrl": "http://83.98.5.9/images/news/cnn.png",
                        "imageUrl": "http://ia.media-
imdb.com/images/M/MV5BNDMyNzcyMTA5MV5BMl5BanBnXkFtZTcwNDAyMDY4Mg@@._V1_SY400_SX279_
AL_.jpg",
                        "publishDate": 1403681958275,
                        "description": "Tracy Morgan, Actor: 30 Rock. Tracy Morgan was born on
November 10, 1968 in \nThe Bronx, New York City, New York, USA as Tracy Jamal
Morgan. He is anÂ ...",
                        "source": "article"
                },
                {
                        "url": "http://www.cnn.com/2014/06/16/showbiz/tracy-morgan-crash/",
                        "title": "Hospitalized Tracy Morgan upgraded to fair condition -
CNN.com",
                        "providerImageUrl": "http://83.98.5.9/images/news/abcnews.png",
                        "imageUrl": "http://i2.cdn.turner.com/cnn/dam/assets/140607062528-
tracy-morgan-0607-horizontal-gallery.jpg",
                        "publishDate": 1403681958275,
                        "description": "Jun 17, 2014 ... Comedian Tracy Morgan, who was badly
injured in a collision June 7, has been \nupgraded from critical to fair condition,
his publicist said.",
                        "source": "article"
                },
                {
                        "url": "http://www.cc.com/comedians/tracy-morgan",
                        "title": "Tracy Morgan | Stand-Up Comedian | Comedy Central Stand-Up",
                        "providerImageUrl": "http://83.98.5.9/images/news/foxnews.png",
                        "imageUrl":
"http://4.images.comedycentral.com/images/ccstandup/comedians/800x600/tracy_morgan_
headshot2013_800x600.jpg?width=180&height=180&crop=true",
                        "publishDate": 1403681958275,
                        "description": "Comedy Central Stand-Up Comedian - All the latest Tracy
Morgan videos, funny \ntweets, Facebook updates, comedy news & biography.",
                        "source": "article"
                },
                {
                        "url": "http://www.cnn.com/2014/06/11/showbiz/tracy-morgan-crash/",
                        "title": "Tracy Morgan crash: Trucker pleads not guilty - CNN.com",
                        "providerImageUrl": "http://83.98.5.9/images/news/cnn.png",
                        "imageUrl": "http://i2.cdn.turner.com/cnn/dam/assets/140607062528-
tracy-morgan-0607-story-top.jpg",
                        "publishDate": 1403681958275,
                        "description": "Jun 12, 2014 ... The driver whose truck plowed into a
bus carrying Tracy Morgan pleaded not \nguilty Wednesday in a New Jersey court to
vehicular homicide.",
                        "source": "article"
                },
                {
                        "url": "http://abcnews.go.com/Entertainment/tracy-morgan-responsive-
day-crash/story?id=24045450",
                        "title": "Tracy Morgan 'More Responsive' Day After Crash - ABC News",
                        "providerImageUrl": "http://83.98.5.9/images/news/abcnews.png",
                        "imageUrl":
"http://a.abcnews.com/images/Entertainment/GTY_tracy_morgan_2011_comedy_awards_jt_1
40607_16x9_992.jpg",
                        "publishDate": 1403681958275,
                        "url": null,
                        "title": "AfeesAdemola",
                        "providerImageUrl": null,
                        "imageUrl": null,
                        "publishDate": 1403682024000,
                        "description": "Tracy Morgan Crash Truck Driver Charged With Death By
Auto\n\n=> http://t.co/2jqNBRybHl",
                        "source": "twitter"
                },
                {
                        "url": null,
                        "title": "RobertW79886085",
                        "providerImageUrl": null,
                        "imageUrl": null,
```

TABLE IV-continued

Social Feed

```
                "publishDate": 1403681989000,
                "description": "*Funny man Tracy Morgan has known fame and foibles
http://t.co/ZVFK42wyIH",
                "source": "twitter"
            },
            {
                "url": null,
                "title": "GossipDetector",
                "providerImageUrl": null,
                "imageUrl": null,
                "publishDate": 1403681922000,
                "description": "Tracy Morgan Has Been Transferred From Hospital To A
Rehab Center - Comedian Tracy... http://t.co/c0l2Nwnjde\n #ComedianTracyMorgan
#LewisKay",
                "source": "twitter"
            },
            {
                "url": null,
                "title": "Bayyou11DOTcoM",
                "providerImageUrl": null,
                "imageUrl": null,
                "publishDate": 1403681712000,
                "description": "#BYUPDATE: American Comedian Tracy Morgan Goes into
Rehab http://t.co/DbIRwpjjnP",
                "source": "twitter"
            },
            {
                "url": null,
                "title": "crazymagicbroad",
                "providerImageUrl": null,
                "imageUrl": null,
                "publishDate": 1403681673000,
                "description": "@PopeBenjiswag are you implying Tracy Morgan is not the
king of romance? We need to have a chat sir",
                "source": "twitter"
            },
            {
                "url": null,
                "title": "GossipPiggy",
                "providerImageUrl": null,
                "imageUrl": null,
                "publishDate": 1403681621000,
                "description": "Driver in Tracy Morgan Crash Was Speeding - <!-- --
> <!-- --> The Walmart driver. . . http://t.co/uAziFmenON\n
#criticalcondition",
                "source": "twitter"
            },
            {
                "url": null,
                "title": "TehLATimes",
                "providerImageUrl": null,
                "imageUrl": null,
                "description": "Jun 12, 2014 ... Tracy Morgan is improving after the
car accident that left him in critical condition, \naccording to a statement issued
Thursday by his rep LewisÂ ...",
                "source": "article"
            },
            {
                "url": "http://www.tmz.com/person/tracy-morgan/",
                "title": "Tracy Morgan News, Pictures, and Videos | TMZ.com",
                "providerImageUrl": "http://83.98.5.9/images/news/abcnews.png",
                "imageUrl": "http://ll-media.tmz.com/2012/04/16/celeb-tracy-morgan-
240x285-240x285.png",
                "publishDate": 1403681958275,
                "description": "Tracy Jamal Morgan (born November 10, 1968) is an
American actor and \ncomedian who is best known for his eight seasons as a cast
member on Saturday\nÂ ...",
                "source": "article"
            },
            {
                "url": "http://www.usatoday.com/story/news/usanow/2014/06/08/tracy-
morgan-critical-crash/10198791/",
                "title": "Tracy Morgan critical but improving after deadly crash",
                "providerImageUrl": "http://83.98.5.9/images/news/foxnews.png",
                "imageUrl": "http://www.gannett-cdn.com/-mm-
```

TABLE IV-continued

Social Feed

```
/e60e7b29643e3aa0058701c1d822bd7dd7f8bfbb/c=0-784-2524-
2208&r=x1803&c=3200x1800/local/-/media/USATODAY/USATODAY/2014/06/08/1402247375000-
AFP-530481872.jpg",
                "publishDate": 1403681958275,
                "description": "Jun 9, 2014 ... Comic Tracy Morgan was \"more
responsive\" Sunday but remained in critical \ncondition a day after a deadly crash
on the New Jersey Turnpike,Â ...",
                "source": "article"
            },
            {
                "url": "http://www.ticketmaster.com/Tracy-Morgan-
tickets/artist/859932",
                "title": "Tracy Morgan Tickets | Event Dates & Schedule |
Ticketmaster.com",
                "providerImageUrl": "http://83.98.5.9/images/news/cnn.png",
                "imageUrl": "http://media.ticketmaster.com/dbimages/170223a.jpg",
                "publishDate": 1403681958275,
                "description": "Results 1 - 7 of 7 ... Buy Tracy Morgan tickets from
the official Ticketmaster.com site. Find Tracy \nMorgan schedule, reviews and
photos.",
                "source": "article"
            },
            {
                "url": null,
                "title": "Shoegamecrazy__",
                "providerImageUrl": null,
                "imageUrl": null,
                "publishDate": 1403682500000,
                "description": "Tracy Morgan ass funny
\uD83D\uDE29\uD83D\uDE39\uD83D\uDC80",
                "source": "twitter"
            },
            {
                "url": null,
                "title": "GeEkYGoSsiP__",
                "providerImageUrl": null,
                "imageUrl": null,
                "publishDate": 1403682370000,
                "description": "Tracy Morgan Out of Hospital, Headed to Rehab
http://t.co/pyVycpLhfE\n #carcrash #injuries #rehab #TracyMorgan",
                "source": "twitter"
            },
            {
                "url": null,
                "title": "KentuckyRecord",
                "providerImageUrl": null,
                "imageUrl": null,
                "publishDate": 1403682203000,
                "description": "Feds say trucker in Tracy Morgan crash was speeding -
Â Â #NEWARK, N.J. (AP) -- A... http://t.co/4VrrWTMLlx\n #KevinRoper
#NewJerseyTurnpike",
                "source": "twitter"
            },
            {
                "publishDate": 1403681615000,
                "description": "Tracy Morgan moved to rehab; fiancee thanks his fans
for... http://t.co/KfcMwlotEB\n #JeffMillea #KevinRoper #MeganWollover
#TracyMorgan",
                "source": "twitter"
            },
            {
                "url": null,
                "title": "Gossip_Central__",
                "providerImageUrl": null,
                "imageUrl": null,
                "publishDate": 1403681404000,
                "description": "Tracy Morgan In Fair Health Condition After New #Jersey
Crash - NEW BRUNSWICK, N.J. (AP) â€" Actor and comedian...
http://t.co/3lufkv6319",
                "source": "twitter"
            },
            {
                "url": null,
                "title": "DeezyFullRound",
                "providerImageUrl": null,
                "imageUrl": null,
                "publishDate": 1403681142000,
```

TABLE IV-continued

Social Feed

```
            "description": "MORGAN TRACY \uD83D\uDE08",
            "source": "twitter"
        },
        {
            "url": null,
            "title": "GossipPiggy",
            "providerImageUrl": null,
            "imageUrl": null,
            "publishDate": 1403680695000,
            "description": "Driver in Tracy Morgan Crash Was Speeding - <!-- --
> <!-- --> The Walmart driver... http://t.co/uAziFmenON\n
#criticalcondition",
            "source": "twitter"
        },
        {
            "url": null,
            "title": "GossipDetector",
            "providerImageUrl": null,
            "imageUrl": null,
            "publishDate": 1403680208000,
            "description": "Tracy Morgan Has Been Transferred From Hospital To A
Rehab Center - Comedian Tracy... http://t.co/c0l2Nwnjde\n #ComedianTracyMorgan
#LewisKay",
            "source": "twitter"
        },
        {
            "url": null,
            "title": "GossipPiggy",
            "providerImageUrl": null,
            "imageUrl": null,
            "publishDate": 1403680158000,
            "description": "Tracy Morgan leaves the hospital and enters a rehab
center -  30 Rockâ€™s Tracy... http://t.co/HcHpK2g9eh",
            "source": "twitter"
        }
    ]
}
```

Below the tables II and III "Recommendations and lists" is an example response containing an array of recommendations tiles, each including a video URL and information about how the tile is to be presented at the user terminal.

TABLE II

Recommendations and Lists

| Endpoint | Action | Description | | |
|---|---|---|---|---|
| | | Lists Video tiles based on a search term, number of tiles specified by parameter n | | |
| | | Parameters: | | |
| | | Parameter | Description | |
| /article | GET | q | query term | |
| | | a | number of articles - number of news/blogs returned based on query term (news.google.com) | |

TABLE II-continued

Recommendations and Lists

| | | |
|---|---|---|
| sv | number of short form videos - number of short form videos returned based on query term (youtube.com) | |
| lv | number of long form videos - number of long form videos returned based on query term (horizon.tv) | |
| pid | location id The parameter value is a string that specifies latitude/longitude coordinates (e.g. 37.42307, −122.08427). | |
| lr | The locationRadius parameter, in conjunction with the location parameter, defines a circular geographic area. The parameter value must be a floating point number followed by a measurement unit. Valid measurement units are m, km, ft, and mi. For example, valid parameter values include 1500 m, 5 km, 10000 ft, and 0.75 mi | |

TABLE III

Recommendations and Lists

| Icon Deprecated Endpoint | Action | Description |
|---|---|---|
| /service | GET | Lists Video tiles in the repository, number of tiles specified by parameter n |

TABLE III-continued

| | | Recommendations and Lists |
|---|---|---|
| /vod | GET | Lists Video tiles in the repository, number of tiles specified by parameter n |
| /live | GET | Lists Video (with HLS live stream assets) tiles in the repository, number of tiles specified by parameter n Lists Video tiles based on a youtube search, number of tiles specified by parameter n |

| | | Parameters: | |
|---|---|---|---|
| | | Parameter | Description |
| /youtube/vod | GET | q | query term |
| | | l | location id The parameter value is a string that specifies latitude/longitude coordinates (e.g. 37.42307, −122.08427). |
| | | lr | The locationRadius parameter, in conjunction with the location parameter, defines a circular geographic area. The parameter value must be a floating point number followed by a measurement unit. Valid measurement units are m, km, ft, and mi. For example, valid parameter values include 1500 m, 5 km, 10000 ft and 0.75 mi |

```
{
    recommendations: [
        {
            id: 1,
            live: true,
            title: "Review: Brazil vs Croatia 3-1 - WORLD CUP BRASIL - HD 2014 BRAZIL WINS!~!",
            videoUrl: "http://83.98.5.9/poc-hls/big_buck_bunny_1080p_surround.m3u8",
            boxArtImageUrl: "https://i.ytimg.com/vi/ZiSxp5ABusc/default.jpg",
            stillImageUrl: "https://i.ytimg.com/vi/ZiSxp5ABusc/hqdefault.jpg",
            mp4Urls: {
                hq:  "http://83.98.5.9/poc-mp4/big_buck_bunny_1080p_surround-HQ.mp4",
                mq:  "http://83.98.5.9/poc-mp4/big_buck_bunny_1080p_surround-MQ.mp4",
                lq:  "http://83.98.5.9/poc-mp4/big_buck_bunny_1080p_surround-LQ.mp4"
            },
            date: 1402609903000,
            providerImageUrl: null,
            description: "Brazil vs Croatia 2-1 - WORLD CUP BRASIL - HD 2014 brazil 2014, brasil 2014, brazil vs croatia world cup 2014 , Watch Brazil vs Croatia Live Stream Fifa ..."
        },
        {
            id: 2,
            live: true,
            title: "Brazil vs Croatia 3-1 All Goals & Highlights World Cup Brasil 2014 HD",
            videoUrl: "http://83.98.5.9/poc-hls/tears_of_steel_720p.m3u8",
            boxArtImageUrl: "https://i.ytimg.com/vi/THPHYvL_a88/default.jpg",
            stillImageUrl: "https://i.ytimg.com/vi/THPHYvL_a88/hqdefault.jpg",
            mp4Urls: {
                hq:  "http://83.98.5.9/poc-mp4/tears_of_steel_720p-HQ.mp4",
                mq:  "http://83.98.5.9/poc-mp4/tears_of_steel_720p-MQ.mp4",
                lq:  "http://83.98.5.9/poc-mp4/tears_of_steel_720p-LQ.mp4"
            },
            date: 1402641694000,
            providerImageUrl: null,
            description: "Brazil vs Croatia 3-1 All Goals & Highlights World Cup Brasil 2014 HD Brazil vs Croatia 2014 Brazil vs Croatia 2014 Brazil vs Croatia 2014 Brazil vs Croatia ..."
```

The invention has been described by way of reference to various examples to help in understanding. The invention is not limited to the detail of any example unless such detail is presented as essential by inclusion in an independent claim. All details of all embodiments may be combined either selectively or as a whole, and the invention does not exclude any combination nor is the invention limited to any combination unless such combination is presented as essential by inclusion in an independent claim.

The invention may be implemented in an apparatus, a method, or computer program code.

The apparatus may be a user device, or a server to which a user device is connected, or a system comprising a user device and a server. Each apparatus may include, at least, a processor and a memory and generally be implemented in a user device, or a server to which a user device is connected, or both a user device and a server.

The method may be a computer program. A computer program may be a computer program or executable code which, when run or executed on an apparatus, performs the method. The computer program or executable code may be run on the user device, or the server, or both the user device and the server.

The computer program may be stored on a memory, and may be stored across multiple memories. The memory may be a memory of a functional device, or may be a specific memory storage apparatus such as a memory disk or memory stick. The memory may be a memory available on a network, such as a memory area available in a network such as an area of a so-called 'cloud'.

Aspects of the inventions described herein include any or all of the following features used in any combination. In addition, methods, and computer programs for implementing the method, are contemplated.

The invention claimed is:

1. A recommendation server including a processor configured to:
generate an initial plurality of recommendations including identifiers of initial recommendations;
transmit an initial recommendation message identifying the initial plurality of recommendations to a first user device of a user;
receive a recommendation request including an identification of a selection of one of the initial plurality of recommendations from the first user device of the user;
determine a context of the user of the first user device;
generate a further plurality of recommendations based at least in part on the identified one of the initial plurality of recommendations and the user context, wherein:
in a first user context the further plurality of recommendations are of a first type and are dependent on the selected one of the initial recommendations, and
in a second user context the further plurality of recommendations are of a second type different from the first type and are dependent on the selected one of the initial recommendations; and
transmit a further recommendation message identifying the further plurality of recommendations to a second user device of the user of the first user device, the second user device of the user of the first user device being different than the first user device of the user.

2. The recommendation server of claim 1 in which the processor is further configured to receive a further recommendation request including an identification of a selection of one of the recommendations; and generate the further set of recommendations based on the selected recommendation and the user context; and transmit the further recommendation message based on the further recommendations.

3. The recommendations server of claim 1 further including an interface for receiving a context for a user from a context engine.

4. The recommendations server of claim 1 wherein in a first context the first recommendation is a short form video asset and in a second context the further recommendation is a long form version of the short form video asset.

5. The recommendations server of claim 1 wherein in a given context, the second type of further recommendation is a static article.

6. A recommendation system comprising:
a recommendation server according to claim 1;
the first user device associated with the user; and
the second user device associated with the user,
wherein the processor of the recommendation server is configured to:
transmit the initial recommendation message to the first user device; and
transmit the further recommendation message to the second user device,
wherein the second user device is configured to receive selection of one of the plurality of further recommendations, and display content associated with the selected further recommendation.

7. A method comprising:
generating an initial plurality of recommendations;
transmitting an initial recommendation message to a first user device of a user identifying the initial plurality of recommendations;
receiving a recommendation request including an identification of a selection of one of the initial plurality of recommendations;
generating a further plurality of recommendations based at least in part on the selected one of the initial plurality of recommendations and the user context, wherein:
in a first user context the further plurality of recommendations are of a first type and are dependent on the selected one of the initial recommendations, and
in a second user context the further plurality of recommendations are of a second type different than the first type and are dependent on the selected one of the initial recommendations; and
transmitting a further recommendation message identifying the further plurality of recommendations to a second user device of the user the first user device, the second user device of the user the first user device different from the first user device of the user.

8. The method of claim 7 further comprising generating the initial and further recommendation messages for transmission to a user terminal of a user.

9. The method of claim 7 further comprising receiving a context for a user from a context engine, wherein the user context is determined based on data received from the user device of the user, and user devices of other users.

10. The method of claim 7 wherein in the first user context, the selected further recommendation is a short form video asset and in the second user context the further recommendation is a long form version of the short form video asset.

11. The method of claim 7 wherein in the first user context, the further recommendation is a static article.

12. The method according to claim 7, further comprising transmitting the initial recommendation message to a first user terminal associated with a user, and transmitting the further recommendation message to a second user device associated with the user.

13. A recommendation server including a processor configured to:
generate an initial set of recommendations including identifiers of initial recommendations;
transmit an initial recommendation message based on the initial set of recommendations to a user device;
receive a recommendation request including an identification of a selection of one of the initial set of recommendations from the user device;
determine a context of a user of the user device from which the recommendation request is received, wherein the context of the user of the user device from which the recommendation request is received is determined based on information provided by a plurality of user devices, including user devices associated with other users;

generate a further set of recommendations based at least in part on the identified one of the initial set of recommendations and the context of the user device, wherein:

in a first user context the further recommendations are of a first type and are dependent on the selected one of the initial recommendations, and in a second user context the further recommendations are of a second type different from the first type and are dependent on the selected one of the initial recommendations; and transmit a further recommendation message based on the second set of recommendations.

14. A method comprising:

generating an initial set of recommendations;

transmitting an initial recommendation message based on the initial set of recommendations;

receiving a recommendation request including an identification of a selection of one of the initial set of recommendations;

generating a further set of recommendations based at least in part on the selected one of the initial set of recommendations and a context of the user of a user device from which the recommendation request is received, wherein the context of the user of the user device from which the recommendation request is received is determined based on information provided by a plurality of user devices, including user devices associated with other users, wherein:

in a first user context the further recommendations are of a first type and are dependent on the selected one of the initial recommendations, and in a second user context the further recommendations are of a second type different than the first type and are dependent on the selected one of the initial recommendations; and transmitting a further recommendation message based on the second set of recommendations.

15. A user device including a processor configured to:

receive an initial recommendation message including identifiers of initial recommendations;

display a plurality of initial recommendations based on the identifiers in the initial recommendation message to a user of the user device;

detect selection of one of the displayed plurality of initial recommendations;

request further recommendations, wherein the request for further recommendations identifies the selected initial recommendation;

receive a further recommendation message responsive to the request for further recommendations, including identifiers of further recommendations, wherein the further recommendations are dependent on the context of a user of the user device from which the recommendation request is received as well as the selected one of the initial recommendations, wherein the context for the user of the user device from which the recommendation request is received is determined based on information provided by a plurality of user devices, including user devices associated with other users, such that:

in a first user context the further recommendations are of a first type and are dependent on the selected one of the initial recommendations, and in a second user context the further recommendations are of a second type different than the first type and are dependent on the selected one of the initial recommendations; and display a further plurality of recommendations based on the further recommendations in the further recommendation message.

16. The user device of claim 15 wherein the processor is configured to include an identification of a type of the user device in each request for recommendations, wherein the further recommendation message is generated, in part, dependent on the type of the computer device.

17. The user device of claim 15 wherein the further recommendations of the first type are static images, and the further recommendations of the second type are video images.

18. The user device of claim 17 wherein the processor is configured to display a video representing the further recommendation.

19. The user device of claim 15 wherein the context is based on one or more of: user location; time of day; available time for the user to engage with content; type of user device.

* * * * *